(12) United States Patent
Ahn et al.

(10) Patent No.: US 10,373,504 B2
(45) Date of Patent: Aug. 6, 2019

(54) METHOD OF ACQUIRING INFORMATION ABOUT ANOTHER VEHICLE, METHOD OF PROVIDING VEHICLE INFORMATION, AND VEHICLE COMMUNICATION DEVICE

(71) Applicant: LG Electronics Inc., Seoul (KR)

(72) Inventors: Dongkyun Ahn, Seoul (KR); Youngwoong Kim, Seoul (KR); Inhwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/858,090

(22) Filed: Dec. 29, 2017

(65) Prior Publication Data

US 2019/0096260 A1 Mar. 28, 2019

(30) Foreign Application Priority Data

Sep. 25, 2017 (KR) .................. 10-2017-0123721

(51) Int. Cl.
| | |
|---|---|
| *G08G 1/16* | (2006.01) |
| *G08G 1/0968* | (2006.01) |
| *H04W 4/40* | (2018.01) |
| *H04W 4/46* | (2018.01) |
| *G01C 21/36* | (2006.01) |

(52) U.S. Cl.
CPC ....... *G08G 1/168* (2013.01); *G08G 1/096827* (2013.01); *G08G 1/096855* (2013.01); *G08G 1/162* (2013.01); *H04W 4/40* (2018.02); *G01C 21/36* (2013.01); *H04W 4/46* (2018.02)

(58) Field of Classification Search
None
See application file for complete search history.

(56) References Cited

U.S. PATENT DOCUMENTS

2017/0313304 A1* 11/2017 Shiraishi ............... B60W 10/18
2018/0276351 A1* 9/2018 Patton ............... G06F 17/30864

FOREIGN PATENT DOCUMENTS

| KR | 10-1560984 | 10/2015 |
|---|---|---|
| KR | 10-2017-0089117 | 8/2017 |

* cited by examiner

*Primary Examiner* — Adolf Dsouza
(74) *Attorney, Agent, or Firm* — Fish & Richardson P.C.

(57) ABSTRACT

A method of acquiring, by a vehicle, information about one or more vehicles located outside the vehicle. The method includes: in a state in which the one or more vehicles are located in a global positioning system (GPS) dead zone: receiving, by at least one processor of the vehicle and from the one or more vehicles, (i) location information that includes information about a location of the one or more vehicles, and (ii) situation information that corresponds to the location information and that includes information about a situation of the one or more vehicles; filtering, by the at least one processor, the situation information received from the one or more vehicles; and controlling, by the at least one processor, a user interface device of the vehicle to output content based on a result of filtering the situation information.

21 Claims, 31 Drawing Sheets

1310

1310

METHOD OF ACQUIRING INFORMATION ABOUT ANOTHER VEHICLE, METHOD OF PROVIDING VEHICLE INFORMATION, AND VEHICLE COMMUNICATION DEVICE

CROSS-REFERENCE TO RELATED APPLICATION

This application claims the benefit of an earlier filing date and right of priority to Korean Patent Application No. 10-2017-0123721 filed on Sep. 25, 2017 in the Korean Intellectual Property Office, the disclosure of which is incorporated herein by reference.

TECHNICAL FIELD

The present disclosure generally relates to technologies that exchange information between one or more vehicles.

BACKGROUND

A vehicle is a device that transports a passenger in a passenger-intended direction. A car is a typical example of a vehicle.

Many vehicles are equipped to acquire global positioning system (GPS) information and to provide a navigation function based on the GPS information.

SUMMARY

Implementations disclosed herein enable systems and techniques that adaptively exchange information between vehicles based on availability of GPS information.

In one aspect, a method is disclosed of acquiring, by a vehicle, information about one or more vehicles that are located outside of the vehicle. The method includes: in a state in which the one or more vehicles are located in a global positioning system (GPS) dead zone: receiving, by at least one processor of the vehicle and from the one or more vehicles, (i) location information of the one or more vehicles, and (ii) situation information that corresponds to the location information, wherein the location information includes information about a location of the one or more vehicles and the situation information includes information about a situation of the one or more vehicles; filtering, by the at least one processor, the situation information received from the one or more vehicles; and controlling, by the at least one processor, a user interface device of the vehicle to output content based on a result of filtering the situation information.

In some implementations, filtering the situation information received from the one or more vehicles includes: determining, from among the situation information of the one or more vehicles, first situation information that corresponds to at least one first vehicle among the one or more vehicles that is relevant to the vehicle.

In some implementations, the location information received from the one or more vehicles includes first location information that is generated based on image data acquired by at least one first vehicle among the one or more vehicles.

In some implementations, the first location information is generated based on the image data acquired in a state in which the at least one first vehicle among the one or more vehicles enters the GPS dead zone and based on sensing data acquired by the at least one first vehicle.

In some implementations, the first location information is generated further based on object information that is generated based on the image data and that relates to an object outside the at least one first vehicle among the one or more vehicles that indicates a first location.

In some implementations, the first location information further includes: vertical level information regarding one of a plurality of vertical levels on which the at least one first vehicle among the one or more vehicles is located.

In some implementations, the situation information received from the one or more vehicles includes: parking situation information of the one or more vehicles that corresponds to a location at which the one or more vehicles is parked.

In some implementations, the parking situation information includes: parking completion information that indicates completion of a parking operation of the one or more vehicles at a location corresponding to the location information; and passenger exit information that indicates an exit of at least one passenger from the one or more vehicles at the location at which the one or more vehicles is parked.

In some implementations, the situation information received from the one or more vehicles includes: park-out situation information that indicates a park-out operation of the one or more vehicles from a location corresponding to the location information.

In some implementations, the situation information received from the one or more vehicles includes: moving situation information that indicates a movement of the one or more vehicles at a location corresponding to the location information.

In some implementations, the moving situation information includes: information about a moving direction and a moving speed of the one or more vehicles.

In some implementations, filtering the situation information of the one or more vehicles that are located outside the vehicle includes: acquiring situation information of the vehicle that includes information about a situation of the vehicle; based on the situation information of the vehicle, generating associated information that indicates an association between the situation information of the one or more vehicles and the situation information of the vehicle; and based on the associated information, filtering the situation information of the one or more vehicles.

In some implementations, the associated information includes at least one of: information regarding a distance between the first vehicle and each of the one or more vehicles, information relating a speed of the vehicle to a speed of the one or more vehicles, information indicating whether a path of the vehicle and a path of the one or more vehicles overlap, or information indicating whether a vertical altitude of the vehicle corresponds to a vertical altitude of the one or more vehicles.

In some implementations, controlling the user interface device of the vehicle to output the content based on the result of filtering the situation information includes: determining, by the at least one processor, a warning zone that indicates a region outside the vehicle that is relevant to safety of the vehicle; and controlling, by the at least one processor, the user interface device to display a graphic object corresponding to the warning zone.

In some implementations, controlling the user interface device to display the graphic object includes: applying a graphic effect to the graphic object based on a first period of time elapsing from a time at which first location information corresponding to the filtered situation information relating to the graphic object was generated by the one or more vehicles.

In some implementations, controlling to display the graphic object includes: applying a graphic effect to the graphic object based on a second period of time elapsing from a time at which first location information corresponding to the filtered situation information relating to the graphic object was received from the one or more vehicles.

In some implementations, the method further includes: generating a park-in path or a park-out path for the vehicle based on a result of filtering the situation information of the one or more vehicles.

In some implementations, the situation information of the one or more vehicles includes traffic volume information at an entrance or an exit. Generating the park-in path or the park-out path for the vehicle includes: based on the traffic volume information, determining an entrance for a parking-in operation of the vehicle or an exit for a parking-out operation of the vehicle.

In some implementations, the situation information received from the one or more vehicles includes traffic volume information for each vertical level of a plurality of vertical levels. Generating the park-in path or the park-out path for the vehicle includes: based on the traffic volume information for each vertical level of the plurality of vertical levels, determining a vertical level for a parking-in operation of the vehicle.

In another aspect, a vehicle communication device includes: a receiver that is configured to receive information; at least one processor; and at least one computer-readable medium having stored thereon instructions that, when executed by the at least one processor, cause the at least one processor to perform operations including: in a state in which the one or more vehicles are located in a global positioning system (GPS) dead zone: receiving, through the receiver and from the one or more vehicles, (i) location information of the one or more vehicles, and (ii) situation information that corresponds to the location information, wherein the location information includes information about a location of the one or more vehicles and the situation information includes information about a situation of the one or more vehicles; filtering the situation information received from the one or more vehicles; and controlling a user interface device of the vehicle to output content based on a result of filtering the situation information.

In another aspect, a method is disclosed of providing vehicle information by a vehicle. The method includes: in a state in which the vehicle is in a global positioning system (GPS) dead zone, acquiring, by the vehicle, image data for a region near the vehicle; based on the image data, acquiring, by the vehicle, location information that indicates a location of the vehicle; acquiring, by the vehicle, situation information corresponding to the location information of the vehicle, wherein the situation information indicates a situation of the vehicle; and transmitting, from the vehicle, the location information and the situation information.

It is to be understood that both the foregoing general description and the following detailed description of the present disclosure are exemplary and explanatory and are intended to provide further explanation of the present disclosure as claimed.

DETAILED DESCRIPTION

In some implementations, a vehicle may be configured to determine the vehicle's location by utilizing information that is received from other vehicles that are communicative with the vehicle. For example, such implementations may be useful where the vehicle is unable to access geo-location information, such as global positioning system (GPS) information. Such scenarios may occur, for example, in a parking garage or in other areas where geo-location information is unavailable or inaccurate.

In such scenarios, the vehicle itself may be unable to access accurate geo-location information, and in addition other vehicles around the vehicle may also be unable to access GPS data. Thus, as a result of one or more vehicles being unable to access GPS data with sufficient accuracy or at all (which may generally be referred to as being in a GPS "dead zone"), vehicles may be unable to share accurate location information with each other.

As a particular example, if the vehicle is an autonomous driving vehicle, and if the vehicle and/or other vehicles around the vehicle are positioned in a GPS dead zone, then there may be an increased risk of accidents if the autonomous driving vehicle is unable to accurately determine a location to autonomously control the vehicle.

Implementations disclosed herein may help address the above problems by enabling systems and techniques for acquiring information about other vehicles even in scenarios where the other vehicles are positioned in a global positioning system (GPS) dead zone.

Also disclosed are systems and techniques for providing information about the vehicle itself to another vehicle even when the vehicle itself is positioned in a GPS dead zone.

The term "vehicle" as used herein may include any suitable motorized vehicle, such as an automobile and a motorcycle. Hereinafter, description will be given mainly focusing on an automobile as an example.

The vehicle described in this disclosure may include a vehicle equipped with an internal combustion engine as a power source, a hybrid vehicle equipped with both an engine and an electric motor as a power source, and an electric vehicle equipped with an electric motor as a power source.

In the description below, the left side of the vehicle refers to the left side with respect to the travel direction of the vehicle and the right side of the vehicle refers to the right side with respect to the travel direction of the vehicle.

Figure 1:
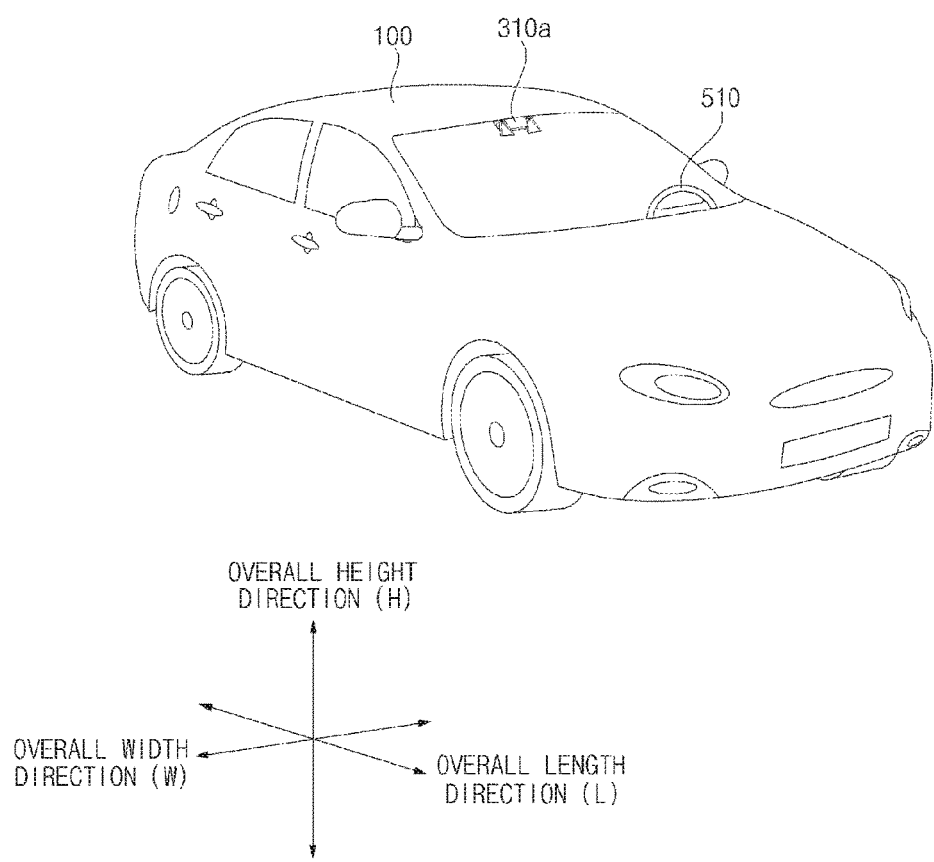
FIG. 1 is a diagram illustrating an example of the exterior of a vehicle according to an implementation.
Figure 2:
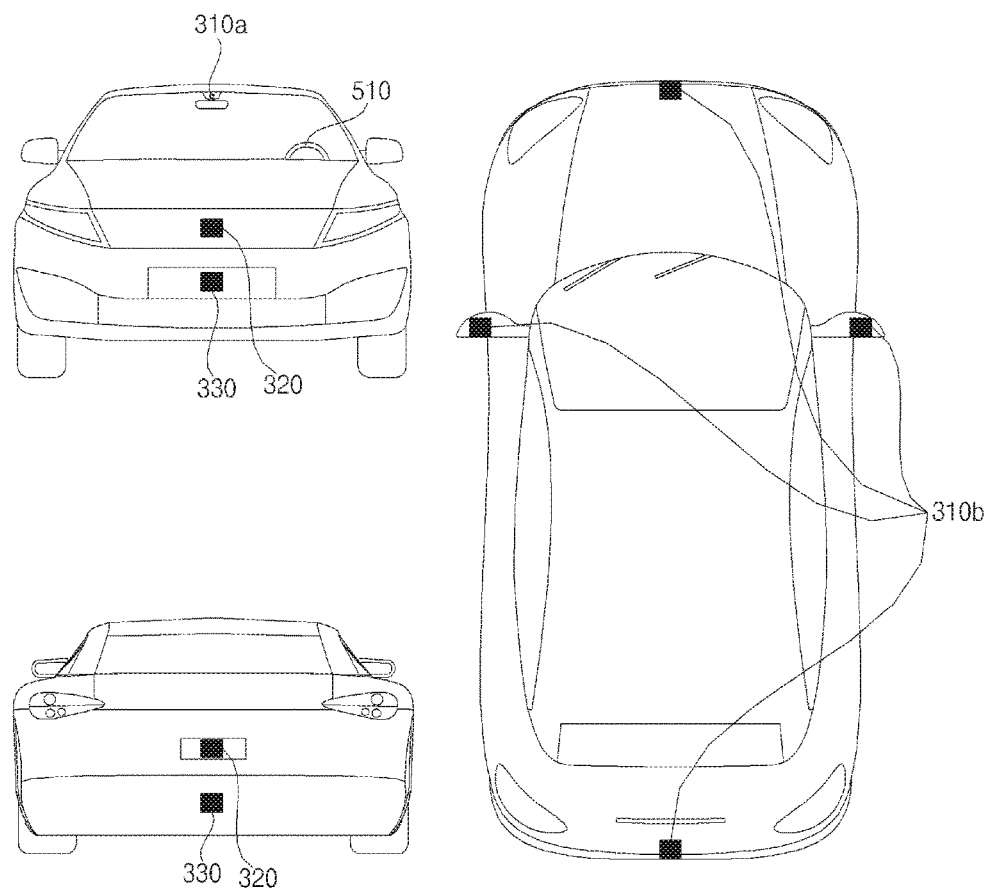
FIG. 2 is a diagram illustrating an example of exteriors of a vehicle, seen at various angles from the outside of the vehicle according to an implementation.
Figure 3:
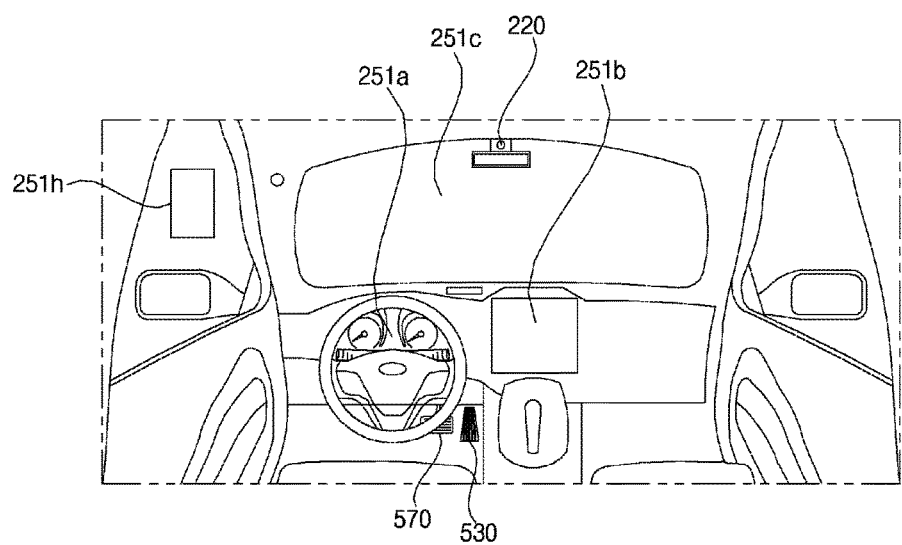
FIGS. 3 and 4 are diagrams illustrating examples of the interior of a vehicle according to an implementation.
Figure 4:
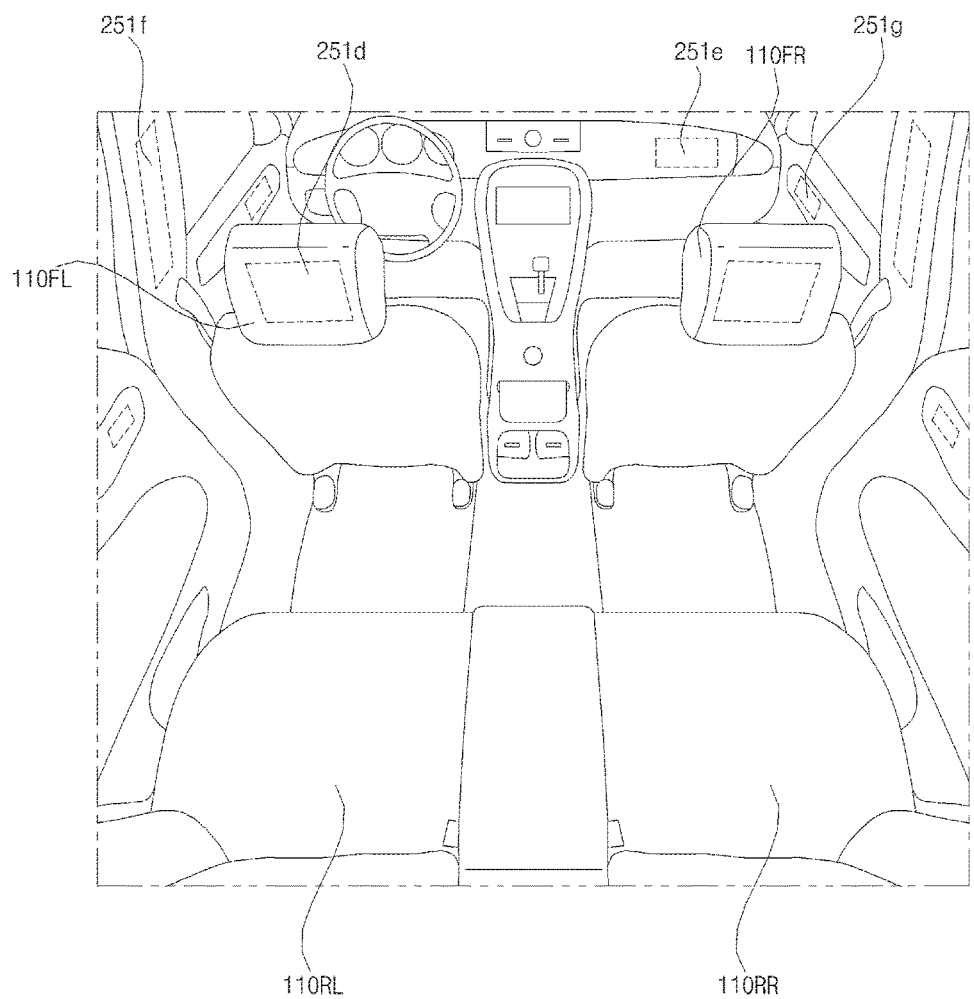
Figure 5:
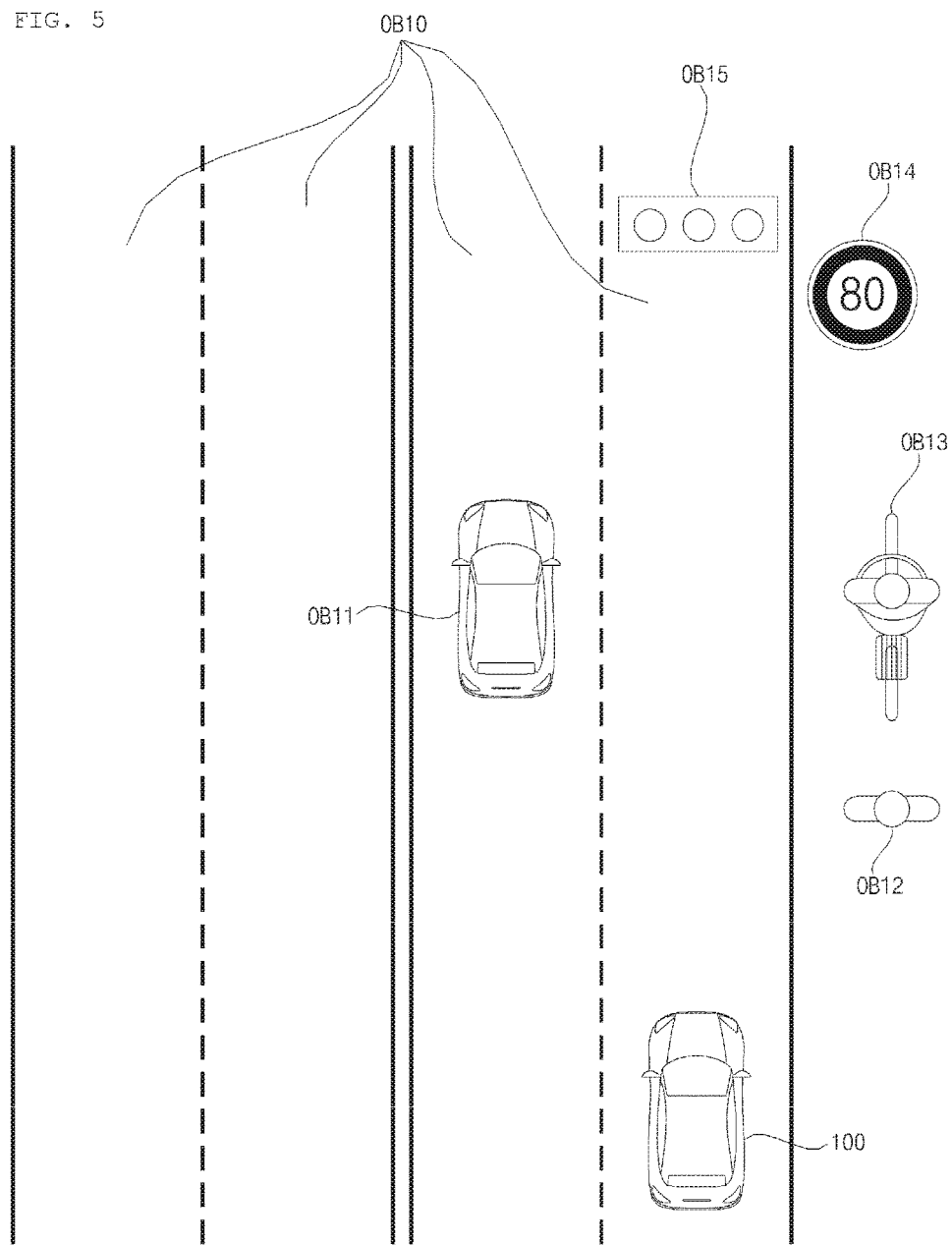
FIGS. 5 and 6 are diagrams illustrating objects that are detected by a vehicle according to an implementation.
Figure 6:
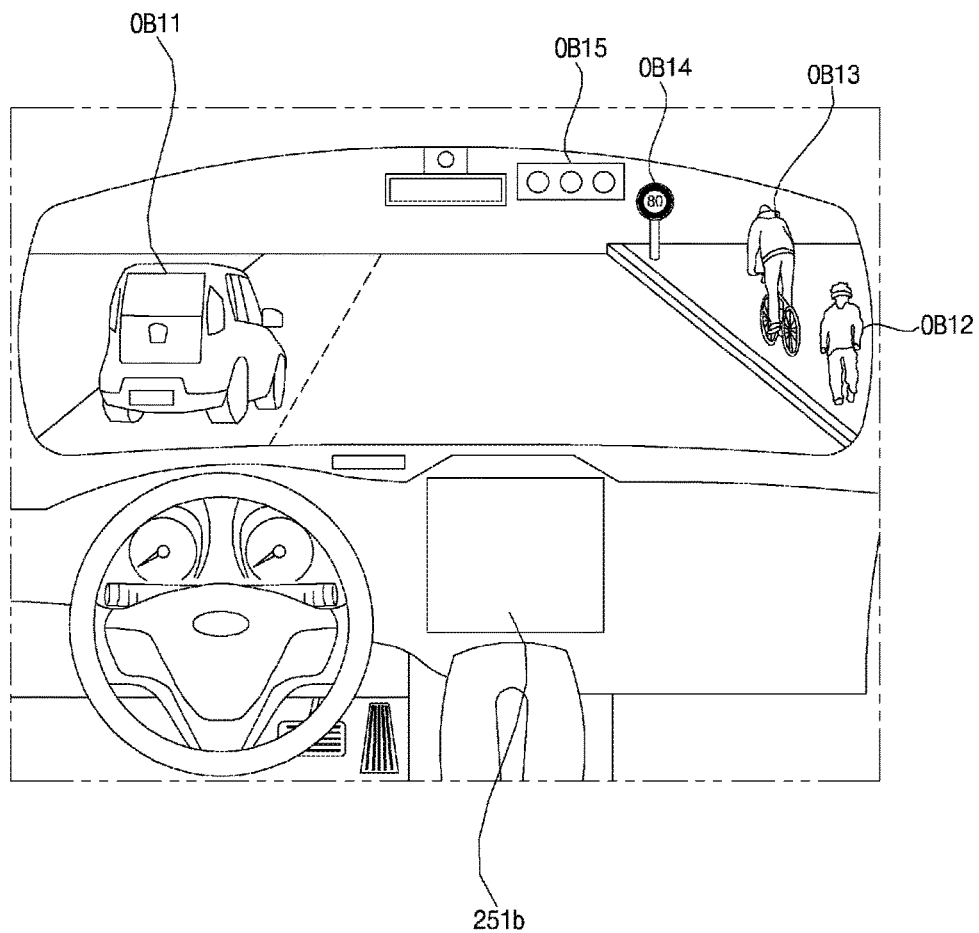
Figure 7:
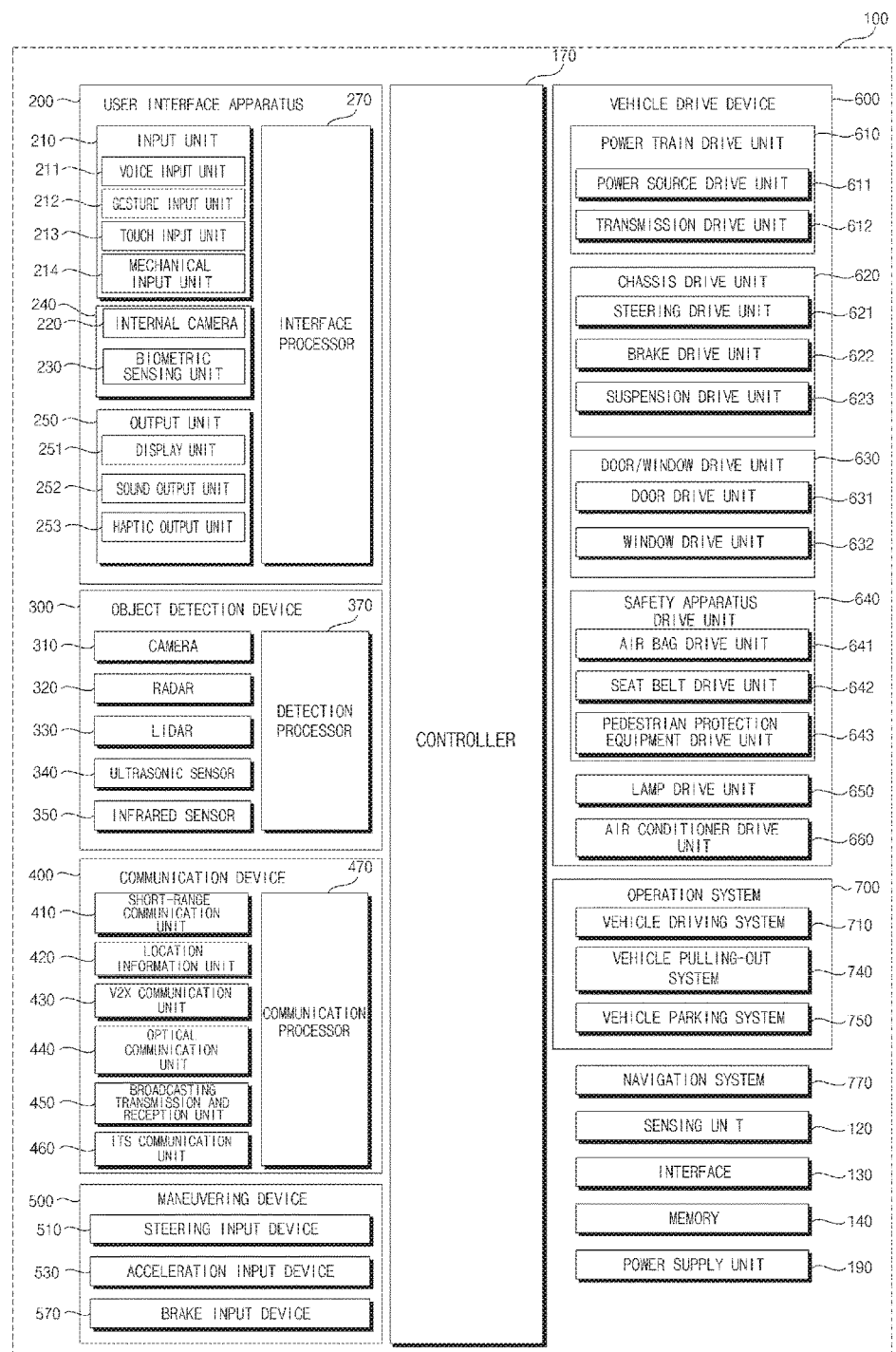
FIG. 7 is a block diagram illustrating an example of a vehicle according to an implementation.

FIG. 1 shows the exterior of a vehicle according to an implementation. FIG. 2 is a view illustrating exteriors of a vehicle, seen at various angles from the outside of the vehicle according to an implementation. FIGS. 3 and 4 are views illustrating the interior of a vehicle according to an implementation. FIGS. 5 and 6 are views referred to for describing objects according to an implementation. FIG. 7 is a block diagram of a vehicle according to an implementation.

Referring to FIGS. 1 to 7, a vehicle 100 may include wheels rotated by a power source, and a steering input device 510 for controlling a travel direction of the vehicle 100.

In some implementations, the vehicle 100 may be an autonomous vehicle. For example, the vehicle 100 may switch to an autonomous driving mode or a manual mode according to a user input.

As an example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on traveling situation information.

The traveling situation information may include at least one of information about objects outside the vehicle, navigation information, or vehicle situation information.

For example, the vehicle 100 may switch from the manual mode to the autonomous driving mode or from the autonomous driving mode to the manual mode, based on traveling situation information generated from an object detection device 300.

For example, the vehicle 100 may switch from the manual mode to the autonomous driving mode or from the autonomous driving mode to the manual mode, based on traveling situation information generated from a communication device 400.

The vehicle 100 may switch from the manual mode to the autonomous driving mode or from the autonomous driving mode to the manual mode, based on information, data, or a signal provided from an external device.

If the vehicle 100 travels in the autonomous driving mode, the autonomous vehicle 100 may be operated based on an operation system 700.

For example, the autonomous vehicle 100 may travel based on information, data, or signals generated from a traveling system 710, a park-out system 740, and a park-in system.

If the vehicle 100 drives in the manual mode, the autonomous vehicle 100 may receive a user input for driving through a driving manipulation device 500. The vehicle 100 may travel based on the user input received through the driving manipulation device 500.

The overall length refers to the length of the vehicle 100 from the front to back of the vehicle 100, the width refers to the width of the vehicle 100, and the height refers to the distance from the bottom of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

As illustrated in FIG. 7, the vehicle 100 may include the UI device 200, the object detection device 300, the communication device 400, the driving manipulation device 500, a vehicle driving device 600, the operation system 700, a navigation system 770, a sensing unit 120, an interface unit 130, a memory 140, at least one processor such as a controller 170, and a power supply 190.

In some implementations, the vehicle 100 may further include other components in addition to the components described in the present disclosure, or may not include one or more or parts of components described in the present disclosure.

The UI device 200 is used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and at least one processor such as processor 270.

In some implementations, the UI device 200 may further include other components in addition to components described below, or may not include one or more or parts of components described herein.

The input unit 210 is provided to receive information from a user. Data collected by the input unit 210 may be analyzed by the processor 270 and processed as a control command from the user.

The input unit 210 may be disposed inside the vehicle 100. For example, the input unit 210 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an infrared (IR) sensor or an image sensor, for sensing a gesture input of the user.

In some implementations, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some implementations, a touch screen may be configured by integrating the touch input unit 213 with a display unit 251. The touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, a door, or the like.

The internal camera 220 may acquire a vehicle interior image. The processor 270 may sense a state of a user based on the vehicle interior image. The processor 270 may acquire information about the gaze of a user in the vehicle interior image. The processor 270 may sense the user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and so on of a user, using the sensor. The biometric information may be used for user authentication.

The output unit 250 is provided to generate a visual output, an acoustic output, or a haptic output.

The output unit 250 may include at least one of the display unit 251, an audio output unit 252, or a haptic output unit 253.

The display unit 251 may display graphic objects corresponding to various kinds of information.

The display unit 251 may include at least one of a liquid crystal display (LCD), a thin film transistor-liquid crystal display (TFT LCD), an organic light-emitting diode (OLED) display, a flexible display, a 3D display, or an e-ink display.

The display unit 251 may form a layered structure together with the touch input unit 213 or be integrated with the touch input unit 213, thereby implementing a touchscreen.

The display unit 251 may be implemented as a head up display (HUD). In this case, the display unit 251 may be provided with a projection module, and output information by an image projected onto the windshield or a window.

The display unit 251 may include a transparent display. The transparent display may be attached to the windshield or a window.

The transparent display may display a specific screen with a specific transparency. To have a transparency, the transparent display may include at least one of a transparent Thin Film Electroluminescent (TFEL) display, a transparent OLED display, a transparent LCD, a transmissive transparent display, or a transparent LED display. The transparency of the transparent display is adjustable.

The UI device 200 may include a plurality of display units 251*a* to 251*g*.

The display unit 251 may be disposed in an area of the steering wheel, areas 251*a*, 251*b*, and 251*e* of the instrument panel, an area 251*d* of a seat, an area 251*f* of a pillar, an area 251*g* of a door, an area of the center console, an area of a head lining, or an area of a sun visor, or may be implemented in an area 251*c* of the windshield, and an area 251*h* of a window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a seat belt, a seat 110FL, 110FR, 110RL, or 110RR, so that a user may perceive the output.

The processor 270 may control an operation of each unit of the UI device 200.

In some implementations, the UI device 200 may include a plurality of processors 270 or no processor 270.

If the UI device 200 does not include any processor 270, the UI device 200 may operate under control of a processor of another device in the vehicle 100, or under control of the controller 170.

The UI device 200 may be referred to as a vehicle display device.

The UI device 200 may operate under control of the controller 170.

The object detection device 300 is used to detect an object outside the vehicle 100. The object detection device 300 may generate object information based on sensing data.

The object information may include information indicating presence or absence of an object, information about the location of an object, information indicating the distance between the vehicle 100 and the object, and information about a relative speed of the vehicle 100 with respect to the object.

The object may be any of various objects related to driving of the vehicle 100.

Referring to FIGS. 5 and 6, the object O may include a lane OB10, another vehicle OB11, a pedestrian OB12, a two-wheeled vehicle OB13, a traffic signal OB14 and OB15, light, a road, a structure, a speed bump, a geographical feature, and an animal.

The lane OB10 may include a traveling lane, a lane next to the traveling lane, and a lane in which a vehicle is driving in the opposite direction. The lane OB10 may include left and right lines that define each of the lanes. The lane may include an intersection.

The other vehicle OB11 may be a vehicle traveling in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The two-wheel vehicle OB13 may be any suitable transportation mechanism moving on two wheels that is located around the vehicle 100. In some scenarios, the two-wheel vehicle OB13 may be a transportation mechanism having two wheels that is located within a predetermined distance from the vehicle 100. For example, the 2-wheel vehicle OB13 may be a motorcycle or bicycle on a sidewalk or a roadway.

The traffic signals may include a traffic signal lamp OB15, a traffic sign OB14, and a symbol or text drawn or written on a road surface.

The light may be light generated from a lamp of another vehicle. The light may be generated from a street lamp. The light may be sunlight.

The road may include a road surface, a curve, and a slope such as an uphill or downhill road.

The structure may be an object fixed on the ground, near to a road. For example, the structure may be any of a street lamp, a street tree, a building, a utility pole, a signal lamp, a bridge, a curb, and a wall.

The geographical feature may include a mountain, a hill, and so on.

Objects may be classified into mobile objects and stationary objects. For example, the mobile objects may include another vehicle and a pedestrian. For example, the stationary objects may include a traffic signal, a road, a structure, another stationary vehicle, and a stationary pedestrian.

The object detection device 300 may include a camera 310, a Radio Detection and Ranging (RADAR) 320, a Light Detection and Ranging (LiDAR) 330, an ultrasonic sensor 340, an IR sensor 350, and at least one processor such as processor 370.

In some implementations, the object detection device 300 may further include other components in addition to components described below, or may not include one or more or parts of components described below.

To acquire a vehicle exterior image, the camera 310 may be disposed at an appropriate position on the exterior of the vehicle 100. The camera 310 may be a mono camera, a stereo camera 310a, Around View Monitoring (AVM) cameras 310b, or a 360-degree camera.

The camera 310 may acquire information about the location of an object, information about a distance to the object, or information about a relative speed with respect to the object by any of various image processing algorithms.

For example, the camera 310 may acquire information about a distance to an object and information about a relative speed with respect to the object in an acquired image, based on a variation in the size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310a.

For example, to acquire an image of the front view of the vehicle 100, the camera 310 may be disposed in the vicinity of a front windshield inside the vehicle 100. Alternatively, the camera 310 may be disposed around a front bumper or a radiator grille.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side view mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or on a side of the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in the driven manner, the LiDAR 330 may be rotated by a motor and detect an object around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or on a side of the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or on a side of the vehicle 100.

The IR sensor 350 may include an IR transmitter and an IR receiver. The IR sensor 350 may detect an object by IR light, and determine the location, distance, and relative speed of the detected object.

The IR sensor 350 may be disposed at an appropriate position on the exterior of the vehicle 100 in order to sense an object ahead of, behind, or on a side of the vehicle 100.

The processor 370 may control an overall operation of each unit of the object detection device 300.

The processor 370 may detect or classify an object by comparing data sensed by the camera 310, the RADAR 320, the LiDAR 330, the ultrasonic sensor 340, and the IR sensor 350 with pre-stored data.

The processor 370 may detect an object and track the detected object, based on an acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in the size of the object over time.

For example, the processor 370 may acquire information about a distance to an object and information about a relative speed with respect to the object from an image acquired from the stereo camera 310a.

For example, the processor 370 may acquire information about a distance to an object and information about a relative speed with respect to the object from an image acquired from the stereo camera 310a, based on disparity information.

The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

In some implementations, the object detection device 300 may include a plurality of processors 370 or no processor 370. For example, the camera 310, the RADAR 320, the LiDAR 330, the ultrasonic sensor 340, and the IR sensor 350 may include individual processors.

If the object detection device 300 includes no processor 370, the object detection device 300 may operate under control of a processor of a device in the vehicle 100 or under control of the controller 170.

The object detection device 300 may operate under control of the controller 170.

The communication device 400 is used to communicate with an external device. The external device may be another vehicle, a mobile terminal, or a server.

The communication device 400 may include at least one of a transmit antenna and a receive antenna, for communication, or a Radio Frequency (RF) circuit and device, for implementing various communication protocols.

The communication device 400 may include a short-range communication unit 410, a location information unit 420, a vehicle-to-everything (V2X) communication unit 430, an optical communication unit 440, a broadcasting transceiver unit 450, an intelligent transport system (ITS) communication unit 460, and at least one processor such as processor 470.

In some implementations, the communication device 400 may further include other components in addition to components described below, or may not include one or more or parts of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a global positioning system (GPS) module or a Differential Global Positioning System (DGPS) module.

The V2X communication unit 430 is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some implementations, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may control an overall operation of each unit of the communication device 400.

In some implementations, the communication device 400 may include a plurality of processors 470 or no processor 470.

If the communication device 400 does not include any processor 470, the communication device 400 may operate under control of a processor of another device in the vehicle 100 or under control of the controller 170.

The communication device 400 may be configured along with the UI device 200, as a vehicle multimedia device. In this case, the vehicle multimedia device may be referred to as a telematics device or an Audio Video Navigation (AVN) device.

The communication device 400 may operate under control of the controller 170.

The driving manipulation device 500 is used to receive a user command for driving the vehicle 100.

In the manual mode, the vehicle 100 may travel based on a signal provided by the driving manipulation device 500.

The driving manipulation device 500 may include the steering input device 510, an acceleration input device 530, and a brake input device 570.

The steering input device 510 may receive a travel direction input for the vehicle 100 from a user. The steering input device 510 may take the form of a wheel to rotate to provide a steering input. In some implementations, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. In some implementations, the acceleration input device 530 or the brake input device 570 may be configured as a touch screen, a touchpad, or a button.

The driving manipulation device 500 may operate under control of the controller 170.

The vehicle driving device 600 is used to electrically control operations of various devices of the vehicle 100.

The vehicle driving device 600 may include at least one of a power train driving unit 610, a chassis driving unit 620, a door/window driving unit 630, a safety device driving unit 640, a lamp driving unit 650, or an air conditioner driving unit 660.

In some implementations, the vehicle driving device 600 may further include other components in addition to components described below, or may not include one or more or parts of components described below.

The vehicle driving device 600 may include a processor. Each unit of the vehicle driving device 600 may include a processor.

The power train driving unit 610 may control operation of a power train device.

The power train driving unit 610 may include a power source driver 611 and a transmission driver 612.

The power source driver 611 may control a power source of the vehicle 100.

For example, if the power source is a fossil fuel-based engine, the power source driver 611 may perform electronic control on the engine. Therefore, the power source driver 611 may control an output torque of the engine, and the like. The power source driver 611 may adjust the engine output torque under control of the controller 170.

For example, if the power source is an electrical energy-based motor, the power source driver 611 may control the motor. The power source driver 611 may adjust a rotation speed, torque, and so on of the motor under control of the controller 170.

The transmission driver 612 may control a transmission.

The transmission driver 612 may adjust a state of the transmission. The transmission driver 612 may adjust the state of the transmission to drive D, reverse R, neutral N, or park P.

If the power source is the engine, the transmission driver 612 may adjust the engagement state of gears in the drive mode D.

The chassis driving unit 620 may control operation of a chassis device.

The chassis driving unit 620 may include a steering driver 621, a brake driver 622, and a suspension driver 623.

The steering driver 621 may perform electronic control on a steering device in the vehicle 100. The steering driver 621 may change a travel direction of the vehicle 100.

The brake driver 622 may perform electronic control on a brake device in the vehicle 100. For example, the brake driver 622 may decrease the speed of the vehicle 100 by controlling an operation of a brake disposed at a wheel.

The brake driver 622 may control a plurality of brakes individually. The brake driver 622 may control braking power applied to a plurality of wheels differently.

The suspension driver 623 may perform electronic control on a suspension device in the vehicle 100. For example, if the surface of a road is rugged, the suspension driver 623 may control the suspension device to reduce jerk of the vehicle 100.

The suspension driver 623 may control a plurality of suspensions individually.

The door/window driving unit 630 may perform electronic control on a door device or a window device in the vehicle 100.

The door/window driving unit 630 may include a door driver 631 and a window driver 632.

The door driver 631 may perform electronic control on a door device in the vehicle 100. For example, the door driver 631 may control opening and closing of a plurality of doors in the vehicle 100. The door driver 631 may control opening or closing of the trunk or the tail gate. The door driver 631 may control opening or closing of the sunroof.

The window driver 632 may perform electronic control on a window device in the vehicle 100. The window driver 632 may control opening or closing of a plurality of windows in the vehicle 100.

The safety device driving unit 640 may perform electronic control on various safety devices in the vehicle 100.

The safety device driving unit 640 may include an airbag driver 641, a seatbelt driver 642, and a pedestrian protection device driver 643.

The airbag driver 641 may perform electronic control on an airbag device in the vehicle 100. For example, the airbag driver 641 may control inflation of an airbag, upon sensing an emergency situation.

The seatbelt driver 642 may perform electronic control on a seatbelt device in the vehicle 100. For example, the seatbelt driver 642 may control securing of passengers on the seats 110FL, 110FR, 110RL, and 110RR by means of seatbelts, upon sensing a danger.

The pedestrian protection device driver 643 may perform electronic control on a hood lift and a pedestrian airbag. For example, the pedestrian protection device driver 643 may control the hood to be lifted up and the pedestrian airbag to be inflated, upon sensing collision with a pedestrian.

The lamp driving unit 650 may perform electronic control on various lamp devices in the vehicle 100.

The air conditioner driving unit 660 may perform electronic control on an air conditioner in the vehicle 100. For example, if a vehicle internal temperature is high, the air conditioner driver 660 may control the air conditioner to operate and supply cool air into the vehicle 100.

The vehicle driving device 600 may include a processor. Each unit of the vehicle driving device 600 may include a processor.

The vehicle driving device 600 may operate under control of the controller 170.

The operation system 700 is a system that controls various operations of the vehicle 100. The operation system 700 may operate in the autonomous driving mode.

The operation system 700 may include the traveling system 710, the park-out system 740, and the park-in system 750.

In some implementations, the operation system 700 may further include other components in addition to components described below, or may not include one or more or parts of the described components.

The operation system 700 may include at least one processor. For example, each unit of the operation system 700 may include at least one processor.

In some implementations, if the operation system 700 is implemented in software, the operation system 700 may be implemented by one or more processors, such as controller 170.

In some implementations, the operation system 700 may include at least one of the UI device 200, the object detection device 300, the communication device 400, the driving manipulation device 500, the vehicle driving device 600, the navigation system 770, the sensing unit 120, or the controller 170.

The traveling system 710 may drive the vehicle 100.

The traveling system 710 may drive the vehicle 100 by providing a control signal to the vehicle driving device 600 based on navigation information received from the navigation system 770.

The traveling system 710 may drive the vehicle 100 by providing a control signal to the vehicle driving device 600 based on object information received from the object detection device 300.

The traveling system 710 may drive the vehicle 100 by receiving a signal from an external device through the communication device 400 and providing a control signal to the vehicle driving device 600.

The driving system 710 may be a system that includes at least one of the UI device 200, the object detection device 300, the communication device 400, the driving manipulation device 500, the vehicle driving device 600, the navigation system 770, the sensing unit 120, or the controller 170, and drives the vehicle 100.

The traveling system 710 may be referred to as a vehicle driving control device.

The park-out system 740 may perform park-out of the vehicle 100.

The park-out system 740 may perform park-out of the vehicle 100 by providing a control signal to the vehicle driving device 600 according to navigation information received from the navigation system 770.

The park-out system 740 may perform park-out of the vehicle 100 by providing a control signal to the vehicle driving device 600 based on object information received from the object detection device 300.

The park-out system 740 may perform park-out of the vehicle 100 by receiving a signal from an external device through the communication device 400 and providing a control signal to the vehicle driving device 600.

The park-out system 740 may be a system that includes at least one of the UI device 200, the object detection device 300, the communication device 400, the driving manipulation device 500, the vehicle driving device 600, the navigation system 770, the sensing unit 120, or the controller 170 and performs park-out of the vehicle 100.

The park-out system 740 may be referred to as a vehicle park-out control device.

The park-in system 750 may perform park-in of the vehicle 100.

The park-in system 750 may perform park-in of the vehicle 100 by providing a control signal to the vehicle driving device 600 according to navigation information received from the navigation system 770.

The park-in system 750 may perform park-in of the vehicle 100 by providing a control signal to the vehicle driving device 600 based on object information received from the object detection device 300.

The park-in system 750 may perform park-in of the vehicle 100 by providing a control signal to the vehicle driving device 600 according to a signal received from an external device via the communication device 400.

The park-in system 750 may be a system that includes at least one of the UI device 200, the object detection device 300, the communication device 400, the driving manipulation device 500, the vehicle driving device 600, the navigation system 770, the sensing unit 120, or the controller 170, and performs park-in of the vehicle 100.

The park-in system 750 may be referred to as a vehicle park-in control device.

The navigation system 770 may provide navigation information. The navigation information may include at least one of map information, set destination information, route information based on setting of a destination, information about various objects on a route, lane information, or information about a current location of a vehicle.

The navigation system 770 may include a memory and a processor. The memory may store navigation information. The processor may control operation of the navigation system 770.

In some implementations, the navigation system 770 may receive information from an external device via the communication device 400 and update pre-stored information with the received information.

In some implementations, the navigation system 770 may be classified as a lower-level component of the UI device 200.

The sensing unit 120 may sense a vehicle state. The sensing unit 120 may include an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, a brake pedal position sensor, and so on.

The inertial navigation unit (IMU) sensor may include one or more of an acceleration sensor, a gyro sensor, and a magnetic sensor.

The sensing unit 120 may acquire a sensing signal of vehicle position information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 120 may generate vehicle situation information based on the sensing data. The vehicle situation information may be generated based on data detected by various sensors included in the vehicle.

For example, the vehicle situation information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The interface unit 130 serves paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path along which electric energy is supplied to a connected mobile terminal. When the mobile terminal is electrically connected to the interface unit 130, the interface unit 130 may supply electric energy received from the power supply 190 to the mobile terminal under control of the controller 170.

The memory 140 is electrically connected to the controller 170. The memory 140 may store default data for a unit, control data for controlling the operation of the unit, and input and output data. The memory 140 may be any of various storage devices in hardware, such as read only memory (ROM), random access memory (RAM), erasable and programmable ROM (EPROM), flash drive, and hard drive. The memory 140 may store various data for an overall operation of the vehicle 100, such as programs for processing or control in the controller 170.

In some implementations, the memory 140 may be integrated with the controller 170, or configured as a lower level component of the controller 170.

The controller 170 may control an overall operation of each unit in the vehicle 100. The controller 170 may be referred to as an electronic control unit (ECU).

The power supply 190 may supply power required for an operation of each component under control of the controller 170. In particular, the power supply 190 may receive power from a battery, etc. in the vehicle.

One or more processors and the controller 170, included in the vehicle 100, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

Figure 8A:
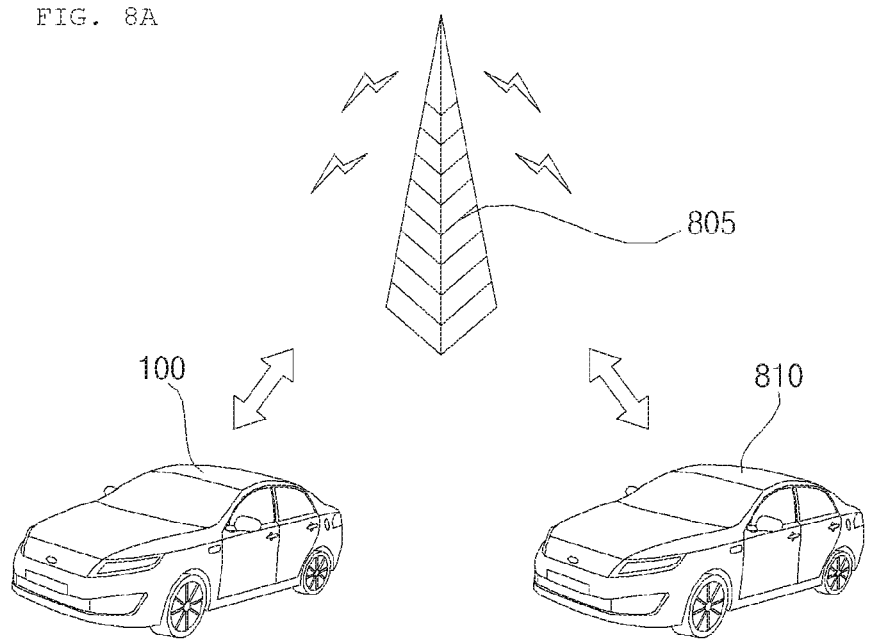
FIGS. 8A to 8B are diagrams illustrating examples of a V2X communication system according to an implementation.
Figure 8B:
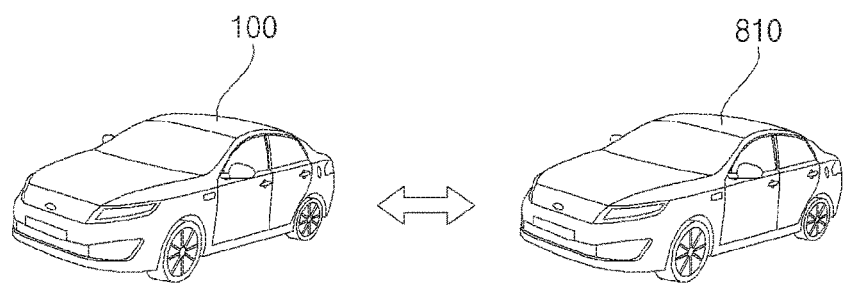

FIGS. 8A to 8B are diagrams for explanation of a V2X communication system according to an implementation.

As shown in FIG. 8A, the vehicle 100 may V2X communicate with another vehicle 810 through the communication device 400 for a vehicle using a base station 805 as a medium.

The base station 805 may include a road side unit (RSU) in some implementations.

As shown in FIG. 8B, the vehicle 100 may directly V2X communicate with the other vehicle 810 through the communication device 400.

The vehicle 100 may V2X communicate with the other vehicle 810 using a first communication method and/or a second communication method.

The first communication method described in this specification may be V2X technology of IEEE802.11p. For example, the first communication method may be an intelligent transportation system (ITS)-G5 method or a wireless access in vehicular environment (WAVE) method.

The second communication method described in this specification may be mobile communication technology. For example, the second communication method may be a 5G method or a long-term evolution (LTE) method.

In some implementations, the first communication method and the second communication method may use a frequency in a first band. In this case, the first communication method may use a frequency in a first sub band. The second communication method may use a frequency in a second sub band. The first sub band and the second sub band may be included in the first band.

In some implementations, the first communication method may use a frequency in a first band. The second communication method may use a frequency in a second band.

Hereinafter, a vehicle may be differentiated as owned vehicle and another vehicle.

Another vehicle may be a vehicle 810 that is positioned in a global positioning system (GPS) dead zone and provides location information and situation information.

The owned vehicle may be the vehicle 100 that receives location information and situation information from the other vehicle 810 positioned in the GPS dead zone.

In some implementations, in a state in which the vehicle 100 is positioned in the GPS dead zone, the vehicle 100 may provide the location information and the situation information to the other vehicle 810.

Figure 9:
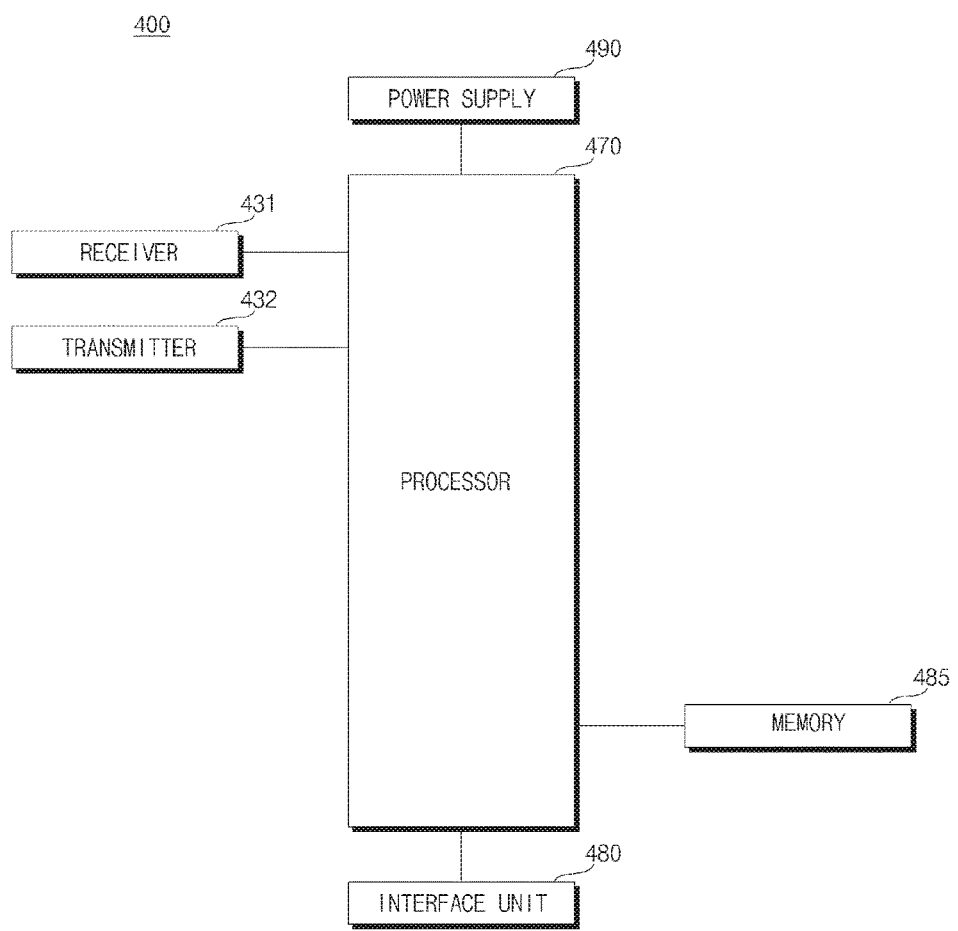
FIG. 9 is a block diagram illustrating an example of a communication device according to an implementation.

FIG. 9 is a block diagram illustrating an example of the communication device 400 according to an implementation.

Referring to FIG. 9, the vehicle 100 may be capable of enabling inter-vehicle communication (V2V communication or V2X communication).

The communication device 400 for a vehicle may be referred to as a V2X communication device.

The communication device 400 for a vehicle may include a receiver 431, a transmitter 432, a processor 470, an interface unit 480, a memory 485, and a power supply 490.

The receiver 431 and the transmitter 432 may be included in a V2X communicator 430.

The receiver 431 may receive information, data, or a signal from another vehicle or an infrastructure. The receiver 431 may include a radio frequency (RF) circuit including a reception antenna.

The receiver 431 may receive the location information of the other vehicle 810 and the situation information of the other vehicle 810 from the other vehicle 810.

A plurality of other vehicles 810 may be present.

The plurality of other vehicles 810 may be present in the GPS dead zone.

The receiver 431 may receive location information of each of the plurality of other vehicles and situation information of each of the plurality of other vehicles based on the location information.

The receiver 431 may be operated under control of the processor 470.

The transmitter 432 may transmit information, data, or a signal to another vehicle or an infrastructure. The transmitter 432 may include a radio frequency (RF) circuit including a transmission antenna.

The transmitter 432 may be operated under control of the processor 470.

In some implementations, the receiver 431 and the transmitter 432 may be integrated together. In this case, a reception RF circuit and a transmission RF circuit may be integrated together as a communication RF circuit.

The processor 470 may be electrically connected to each unit of the communication device 400.

The processor 470 may control an overall operation of each unit of the communication device 400.

The processor 470 may control the receiver 431 and the transmitter 432.

The processor 470 may the signal, information, and data processed through the receiver 431.

The processor 470 may receive a signal, information, or data from another device in the vehicle 100 through the interface unit 480.

The processor 470 may process the signal, information, or data received from another device in the vehicle 100 and may transmit them to an external device through the transmitter 432.

The processor 470 may filter the situation information of the plurality of other vehicles, for example by filtering the situation information of each of the plurality of other vehicles.

In some implementations, the processor 470 may filter the situation information of the plurality of other vehicles to determine filtered situation information that is likely to affect the vehicle 100.

In some implementations, the processor 470 may further determine a particular vehicle for which to filter situation information. The processor 470 may filter the situation information of the plurality of other vehicles to determine a particular other vehicle that may affect the vehicle 100. For example, the processor 470 may filter the situation information of the plurality of other vehicles to determine the vehicle 810 as a result of the filtering. In some implementations, the processor 470 may filter the situation information of the particular vehicle 810.

As such, the processor 470 may filter the situation information of a plurality of other vehicles in various ways, and may determine, as a result of the filtering, particular filtered situation information and/or a particular other vehicle that is likely to affect the vehicle 100.

The filtering of the situation information may be performed using any suitable criteria that affects the vehicle 100. Some examples of filtering the situation information are given further below.

The processor 470 may control an output device, such as the UI device 200, to output content based on a result of filtering the situation information that was received from the other vehicle. Such content may include, in some scenarios, control information.

The interface unit 480 may exchange a signal, information, or data with another device included in the vehicle 100.

The interface unit 480 may receive a signal, information, or data from another device included in the vehicle 100.

The interface unit 480 may transmit the received signal, information, or data to the processor 470.

The interface unit 480 may transmit the signal, information, or data generated or processed by the processor 470 to another device included in the vehicle 100.

The memory 485 may be electrically connected to the processor 470. The memory 485 may store basic data of a unit, control data for control of an operation of a unit, and input and output data. The memory 485 may be various storage devices such as ROM, RAM, EPROM, a flash drive, and a hard drive, in terms of hardware. The memory 485 may store various data for an overall operation of the communication device 400, such as a program for processing or control of the processor 470.

In some implementations, the memory 485 may be integrated into the processor 470 or may be implemented as a lower-level component of the processor 470.

The power supply 490 may supply power required for an operation of each component under control of the processor 470. In particular, the power supply 490 may receive power from a battery, and so on included in a vehicle.

Figure 10:
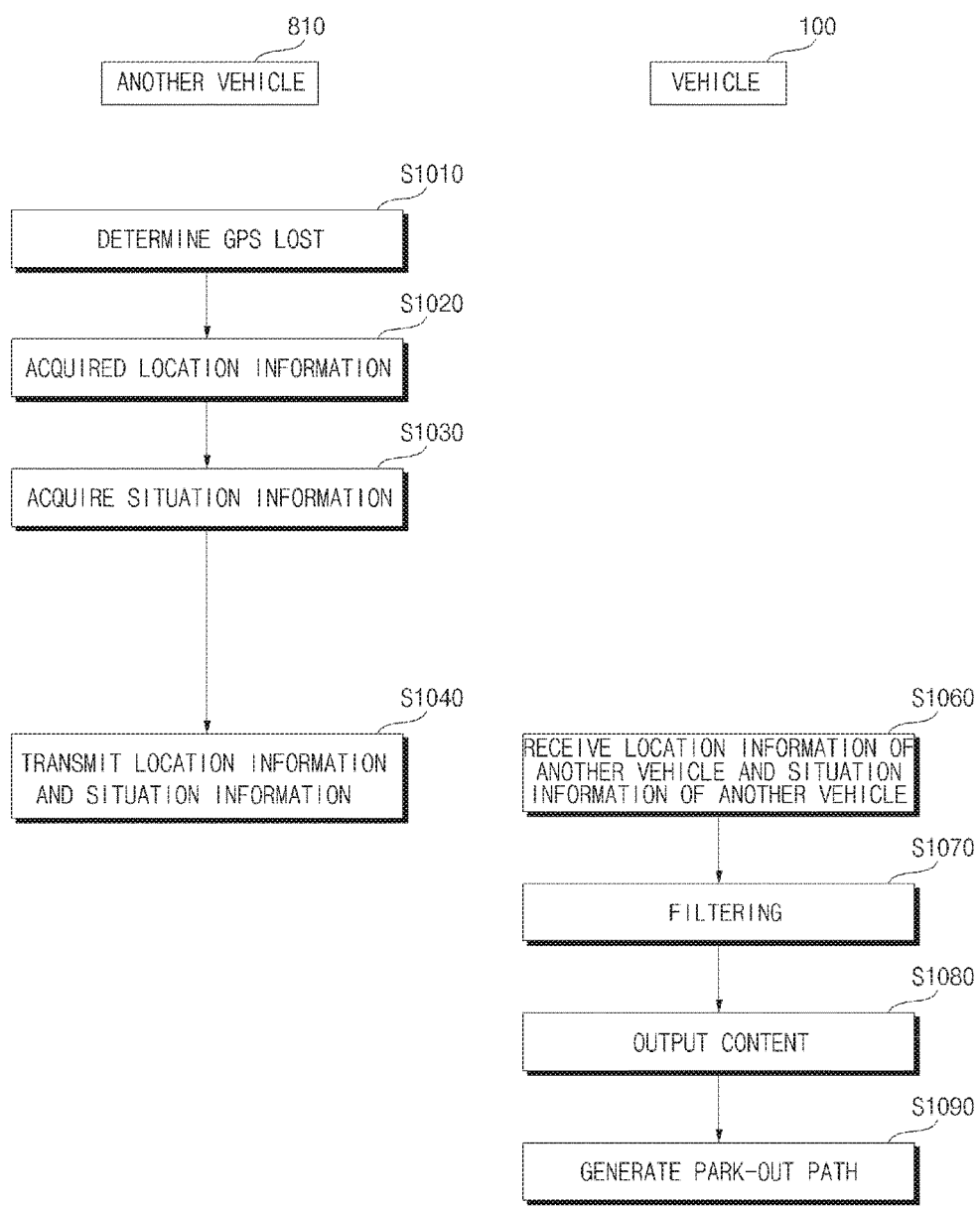
FIG. 10 is a diagram illustrating an example of an operation of a communication device for a vehicle according to an implementation.

FIG. 10 is a diagram illustrating an example of information acquisition and filtering operations of a vehicle according to an implementation.

Referring to FIG. 10, the other vehicle 810 may be positioned in a global positioning system (GPS) dead zone.

The other vehicle 810 may determine GPS lost (S1010).

The other vehicle 810 may acquire location information based on image data acquired by a camera (S1020).

The other vehicle 810 may acquire situation information based on the location information (S1030).

The other vehicle 810 may transmit the location information and the situation information to the vehicle 100 (S1040).

The communication device 400 of the vehicle 100 may receive location information of the other vehicle 810 and situation information of the other vehicle 810 from the other vehicle 810 (S1060).

Although the case in which operations S1010 to S1060 are performed by the other vehicle 810 has been described, operations S1010 to S1060 may be performed by the vehicle 100 when the vehicle 100 is positioned in a GPS dead zone.

The receiver 431 may receive the location information of the other vehicle 810 and the situation information of the other vehicle 810 from the other vehicle 810.

The plurality of other vehicles 810 may be present.

The plurality of other vehicles 810 may be positioned in a GPS dead zone.

The receiver 431 may receive location information of each of the plurality of other vehicles and situation information of each of the plurality of other vehicles based on the location information.

The receiver 431 may provide the received location information of the other vehicle 810 and the received situation information of the other vehicle 810 to the processor 470.

The location information that is received from the other vehicle 810 may have been generated by the other vehicle 810 in various ways. In some implementations, the location information of the other vehicle 810 may be generated based on the image data acquired by the other vehicle 810.

For example, the location information of the other vehicle 810 may be generated based on image data generated during entrance of the other vehicle 810 into a GPS dead zone and sensing data of the other vehicle 810.

As another example, the location information of another vehicle 810 may be generated based on information of an object indicating a position from the image data acquired by the other vehicle 810.

As yet another example, the location information of the other vehicle 810 may include information about a vertical level among a plurality of vertical levels at which the other vehicle 810 is positioned. For example, if the vehicle 810 is located in a multi-level building, then the location information may indicate a level (e.g., a floor) on which the vehicle 810 is located.

The situation information of the other vehicle 810 may include various types of information indicating a situation of the other vehicle corresponding to the location of the vehicle that is indicated by the location information.

For example, the situation information of the other vehicle 810 may include parking situation information of the other vehicle 810 at a point based on the location information of the other vehicle 810.

The parking situation information of the other vehicle 810 may include parking completing information at a point based on the location information of the other vehicle 810.

The parking situation information of the other vehicle 810 may include get-off information of a passenger at a point based on the location information of the other vehicle 810.

The situation information of the other vehicle 810 may include park-out situation information of the other vehicle 810 at a point based on the location information of the other vehicle 810.

The situation information of the other vehicle 810 may include moving situation information of the other vehicle 810 at a point based on the location information of the other vehicle 810.

The moving situation information of the other vehicle 810 may include moving direction information of the other vehicle 810 and moving speed information of the other vehicle 810.

In some implementations, the communication device 400 of the vehicle 100 may filter situation information of each of the plurality of other vehicles (S1070).

In some implementations, the processor 470 may filter the situation information of each of the plurality of other vehicles. For example, the processor 470 may filter situation information that is likely to affect the vehicle 100 from the situation information of each of the plurality of other vehicles.

The processor 470 may filter the other vehicle 810 based on the situation information of each of the plurality of other vehicles. For example, the processor 470 may filter another vehicle that is likely to affect the vehicle 100 based on the situation information of each of the plurality of other vehicles.

Figure 11:
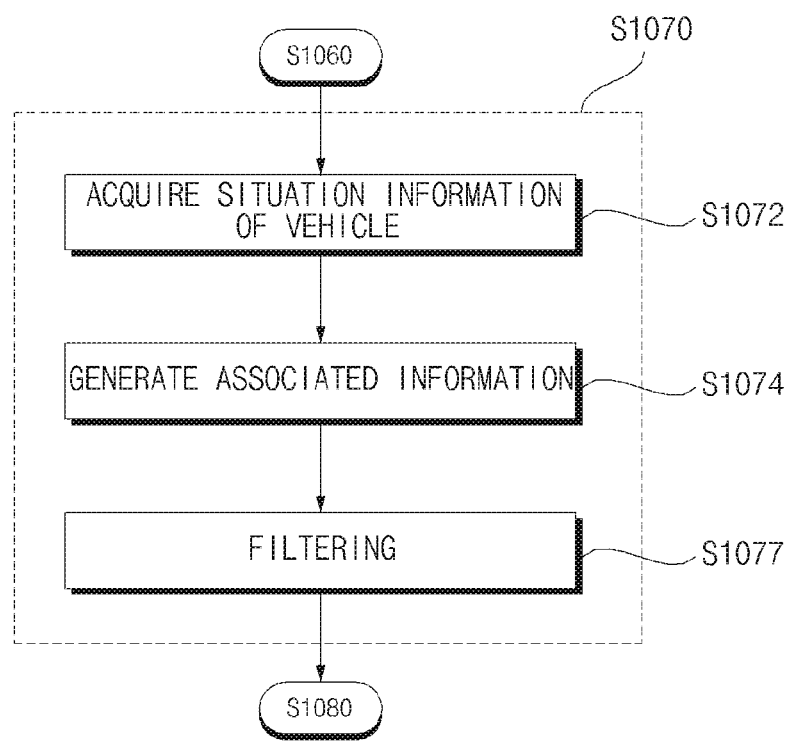
FIG. 11 is a diagram illustrating an example of a filtering operation according to an implementation.

FIG. 11 is a diagram illustrating an example of filtering situation information, according to an implementation. In this example, the filtering operation that is performed on the situation information received from another vehicle (e.g., 810) based on situation information of the vehicle 100 itself. For example, based on an association between the situation information of the other vehicle 810 and the situation information of the vehicle 100 itself, the filtering of the situation information of the other vehicle 810 results in information that is relevant to the vehicle 100 itself.

Referring to the example of FIG. 11, the filtering (S1070) may include acquiring the situation information of the vehicle 100 (1072), generating associated information (S1074), and filtering (S1077).

The communication device 400 of the vehicle 100 may acquire situation information of the vehicle 100 (S1072).

The processor 470 may acquire the situation information of the vehicle 100.

The processor 470 may receive a signal, information, or data from at least one of the UI device 200, the object detection device 300, the driving manipulation device 500, the vehicle driving device 600, the operation system 700, the navigation system 770, or the sensing unit 120 through the interface unit 480.

The processor 470 may acquire the situation information of the vehicle 100 based on the received signal, information, or data.

The communication device 400 of the vehicle 100 may generate associated information of the vehicle 100 and the other vehicle 810 based on the situation information of the vehicle 100 (S1074).

The processor 470 may generate the associated information of the vehicle 100 and the other vehicle 810 based on the situation information of the vehicle 100.

The processor 470 may generate the associated information of the vehicle 100 and the other vehicle 810 based on the situation information of the vehicle 100 and the location information of the other vehicle 810.

The associated information may include various types of information that relates the situations of the other vehicle 810 and the vehicle 100, such as at least one of relative distance information of the vehicle 100 and the other vehicle 810, relative speed information of the vehicle 100 and the other vehicle 810, information about whether paths of the vehicle 100 and the other vehicle 810 overlap with each other, or information about whether altitudes of the vehicle 100 and the other vehicle 810 correspond to each other.

The communication device 400 of the vehicle 100 may filter the situation information of the other vehicle 810 based on the associated information (S1077).

The processor 470 may filter the situation information of the other vehicle 810 based on the associated information.

For example, the processor 470 may filter the situation information of the other vehicle 810 or the other vehicle 810 itself based on whether a relative distance of the vehicle 100 and the other vehicle 810 is within a reference distance.

As another example, the processor 470 may filter the situation information of the other vehicle 810 or the other vehicle 810 itself based on whether relative speed of the vehicle 100 and the other vehicle 810 is greater than or equal to reference speed.

As another example, the processor 470 may filter the situation information of the other vehicle 810 or the other vehicle 810 itself based on whether paths of the vehicle 100 and the other vehicle 810 overlap with each other.

As another example, the processor 470 may filter the situation information of the other vehicle 810 or the other vehicle 810 itself based on whether altitudes of the vehicle 100 and the other vehicle 810 correspond to each other.

Referring back to FIG. 10, the communication device 400 of the vehicle 100 may control the UI device 200 to output content processed based on the filtered situation information of the other vehicle 810 (S1080).

The processor 470 may control the UI device 200 to output content processed based on the control information of the other vehicle 810.

Figure 12:
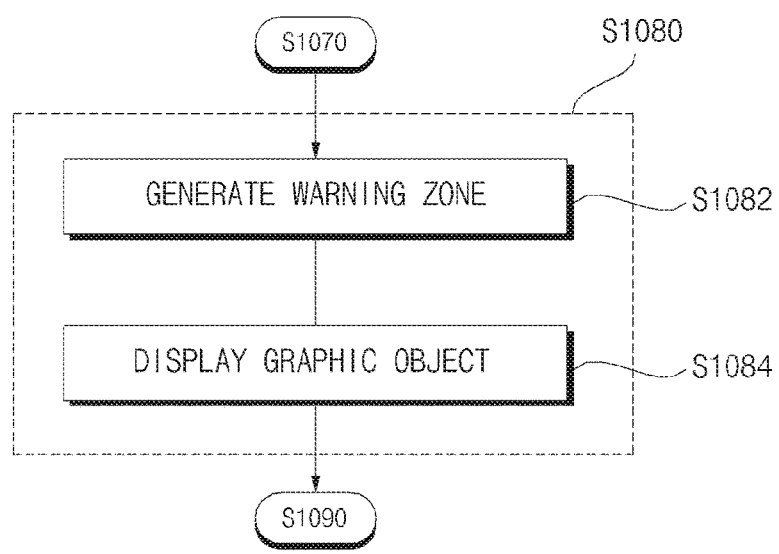
FIG. 12 is a diagram illustrating an example of an operation of outputting content according to an implementation.

FIG. 12 is a diagram for explanation of an operation of outputting content according to an implementation.

Referring to FIG. 12, the controlling of the content output (S1080) may include generating a warning zone (S1082) and controlling display of a graphic object (S1084).

The communication device 400 of the vehicle 100 may generate the warning zone based on the control information of another vehicle (S1082).

The processor 470 may generate the warning zone based on the situation information of another vehicle, filtered in operation S1070.

The warning zone may represent a geographic zone outside the vehicle, for example, relative to the vehicle, within which an alarm is output to a user when an object (e.g., another vehicle or a user) is detected within the zone.

In some implementations, the warning zone may represent a zone in which the likelihood of collision with the vehicle 100 is high, for example when an object (e.g., another vehicle or a user) is positioned within the zone.

As an example, the warning zone may be set as a zone within a predetermined distance from the vehicle 100.

The communication device 400 of the vehicle 100 may be controlled to display a graphic object generated based on the warning zone (S1084).

The processor 470 may control the display 251 to display the graphic object generated based on the warning zone.

The graphic object generated based on the warning zone may include a graphic object formed by visually displaying the warning zone.

In some implementations, controlling of display of the graphic object (S1084) may include applying an effect to the graphic object after a period of time has elapsed from a time at which the location information corresponding to the situation information of the graphic object was generated or received.

For example, the processor 470 may apply a graphic effect to a graphic object after the first period of time elapses from a time point in which the location information of the other vehicle 810 is generated. The location information may be location information that corresponds to the filtered situation information that was used to generate the graphic object.

Such implementations may be useful in scenarios where the vehicle 100 is spaced apart from the other vehicle 810 by a predetermined distance or more, and a warning may need to be performed after a first time elapses from a time point in which the location information is generated.

The first time may be determined by the processor 470 based on a distance between the vehicle 100 and the other vehicle 810 and approximate moving speed of an object (e.g., another vehicle or a passenger of another vehicle).

In some implementations, the controlling of display of the graphic object (S1084) may include applying an effect to a graphic object after a second period of time elapses from a time point in which the location information of another vehicle is received from, rather than generated by, the other vehicle 810. The location information may be location information that corresponds to the filtered situation information that was used to generate the graphic object.

For example, the processor 470 may apply an effect to the graphic object after the second period of time elapses from a time point in which the location information of the other vehicle 810 is received from the filtered another vehicle 810.

Such implementations may be useful in scenarios where the vehicle 100 is spaced apart from the other vehicle 810 by a predetermined distance or more, and a warning may need to be performed after the second time elapses from a time point in which the location information is received.

The second time may be determined by the processor 470 based on a distance between the vehicle 100 and the other vehicle 810 and approximate moving speed of an object (e.g., another vehicle or a passenger of another vehicle).

Referring back to FIG. 10, the communication device 400 of the vehicle 100 may generate a park-in path or a park-out path based on the control information of another vehicle (S1090).

The processor 470 may generate a park-in path or a park-out path based on the control information of the other vehicle 810.

The situation information of the other vehicle 810 may include traffic volume information at an entrance/exit.

The generating of the park-in path or the park-out path (S1090) may include determining an entrance/exit for park-in or park-out based on the traffic volume information at an entrance/exit.

The processor 470 may determine an entrance/exit for park-in or park-out based on the traffic volume information at an entrance/exit.

The situation information of the other vehicle 810 may include traffic volume information for each vertical level (e.g., for each floor in a multi-story building).

The generating of the park-in path or the park-out path (S1090) may include determining a vertical level for park-in based on the traffic volume amount for each vertical level.

The processor 470 may determine the vertical level for park-in based on the traffic volume amount for each vertical level.

Figure 13:
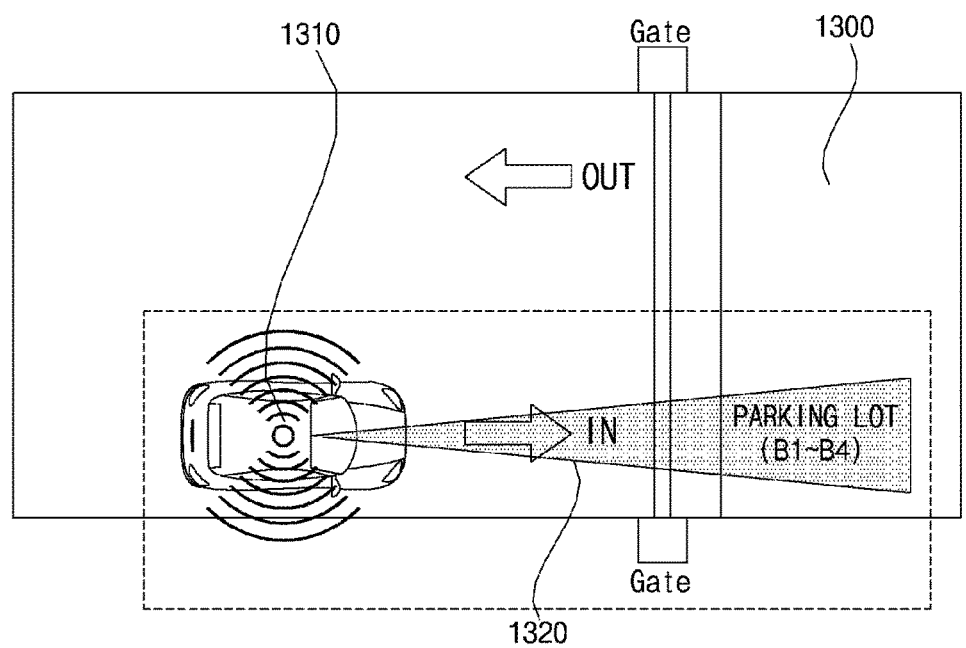
FIGS. 13 to 15 are diagrams illustrating examples of an operation of a vehicle in a global positioning system (GPS) zone according to an implementation.
Figure 14:
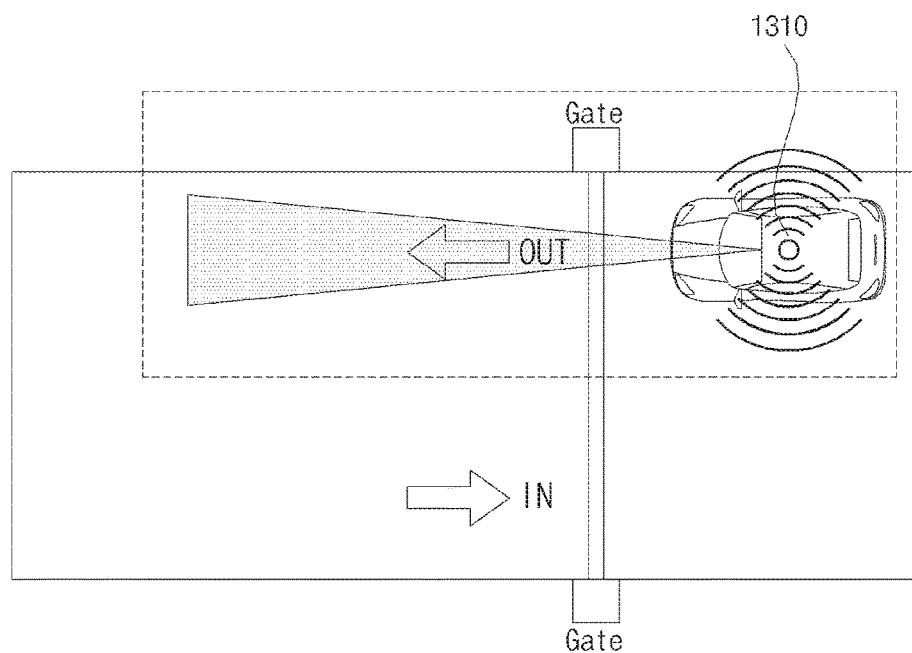
Figure 15:
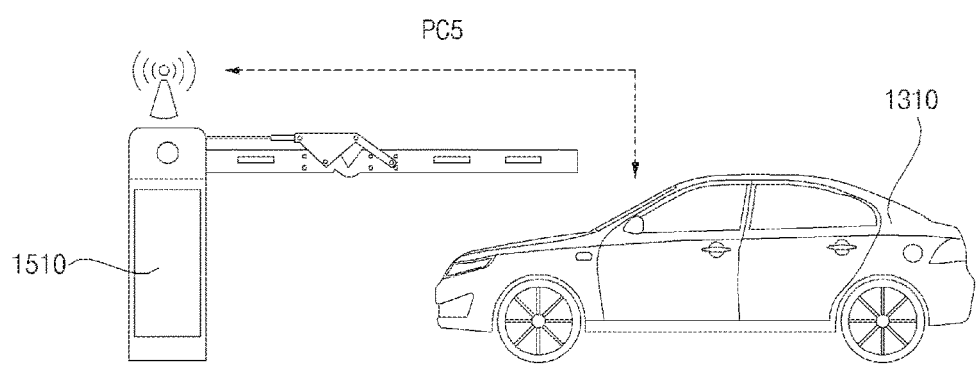

FIGS. 13 to 15 are diagrams for explanation of an operation of a vehicle in a GPS zone according to an implementation.

Referring to FIG. 13, a first vehicle 1310 may enter a global positioning system (GPS) dead zone 1300.

The first vehicle 1310 may be the aforementioned owned vehicle 100 or the other vehicle 810.

The GPS dead zone 1300 may be defined as a zone to which a GPS signal is not reached.

For example, the GPS dead zone 1300 may be an indoor area of a building, an underground or covered parking lot, an underground or covered road way, a tunnel, or the like.

The first vehicle 1310 may acquire image data through a camera included in the first vehicle 1310.

The first vehicle 1310 may acquire image data during entrance into the GPS dead zone 1300 through the included camera.

The first vehicle 1310 may continuously acquire image data through the included camera even after entrance into the GPS dead zone 1300.

The first vehicle 1310 may generate the location information of the first vehicle 1310 based on the image data.

The first vehicle 1310 may generate situation information of the first vehicle 1310 based on location information.

The first vehicle 1310 may transmit the location information and situation information of the first vehicle 1310 to another vehicle.

The first vehicle 1310 may acquire location information of an entrance point of the GPS dead zone based on the image data.

In this case, the first vehicle 1310 may store the location information of an entrance point, in a memory.

The vehicle 100 may receive the location information of the first vehicle 1310 and the situation information of the first vehicle 1310 from the first vehicle 1310.

The processor 470 of the communication device 400 included in the vehicle 100 may receive the location information of the first vehicle 1310 and the situation information of the first vehicle 1310 from the first vehicle 1310.

The location information of the first vehicle 1310 may be generated based on the image data acquired by the first vehicle 1310.

For example, the location information of the first vehicle 1310 may be generated based on the image data acquired during entrance of the first vehicle 1310 into the GPS dead zone 1300 and sensing data of the first vehicle 1310. Here, the sensing data may be data generated by a gyro sensor and an acceleration sensor of the first vehicle 1310.

For example, location information of the first vehicle 1310 may be generated based on information about an object indicating a position from the image data. Here, the object indicating a position may include at least one of a sign saying a position, a pillar saying a position, a wall saying a vertical level in which a vehicle is positioned, or a sign indicating park-in and park-out.

The location information of the first vehicle 1310 may include information about a vertical level of a point at which the first vehicle 1310 is positioned.

Referring to FIG. 14, the first vehicle 1310 may acquire exit point information of the GPS dead zone based on the image data of the GPS dead zone 1300.

When an entrance point and an exit point are the same in the GPS dead zone 1300, the first vehicle 1310 may call location information at an entrance point from the memory.

The first vehicle 1310 may transmit the called location information of the entrance point to another vehicle through a communication device.

Referring to FIG. 15, the first vehicle 1310 may communicate with an infrastructure 1510.

The infrastructure 1510 may be a device configured to transmit a signal and installed in a GPS dead zone.

For example, the infrastructure 1510 may be a gate, a relay, or the like.

The first vehicle 1310 may receive location information of the infrastructure 1510 from the infrastructure 1510.

The first vehicle 1310 may acquire information about a location relationship with the infrastructure 1510 through an object detection device.

The first vehicle 1310 may acquire location information of the first vehicle 1310 based on the location information of the infrastructure 1510 and the location relationship between the first vehicle 1310 and the infrastructure 1510.

Figure 16A:
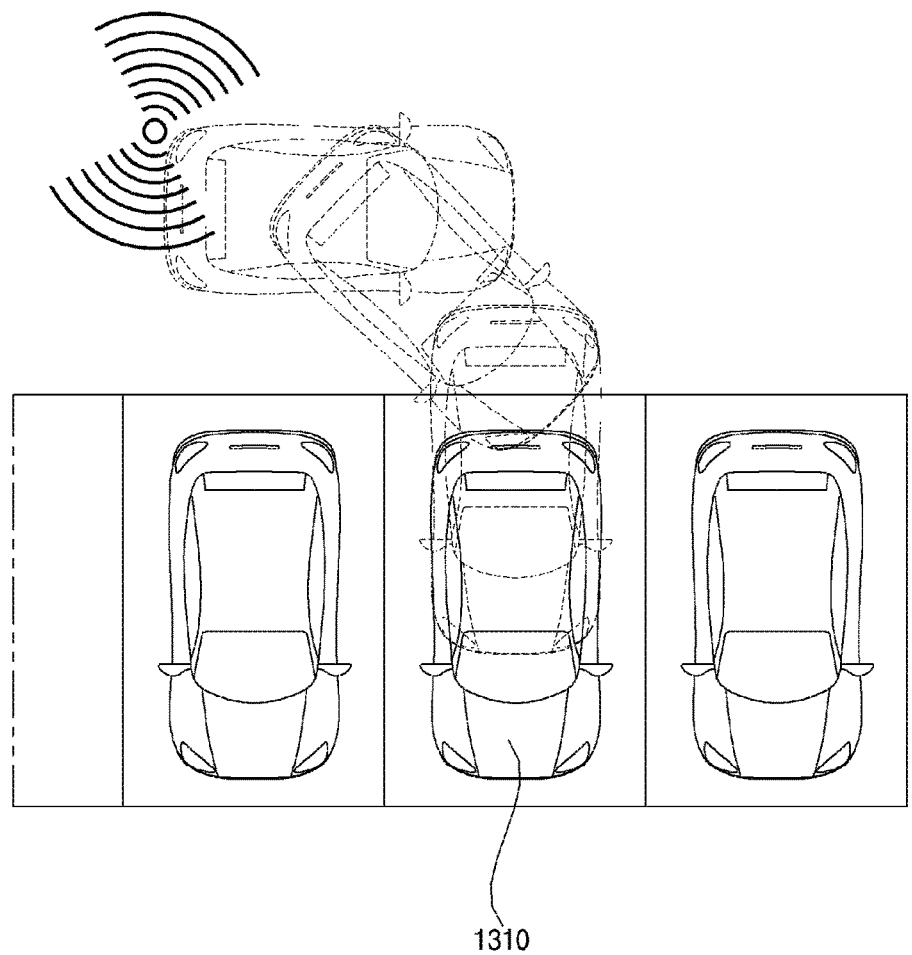
FIGS. 16A, 16B and 17 are diagrams illustrating examples of situation information according to an implementation.
Figure 16B:
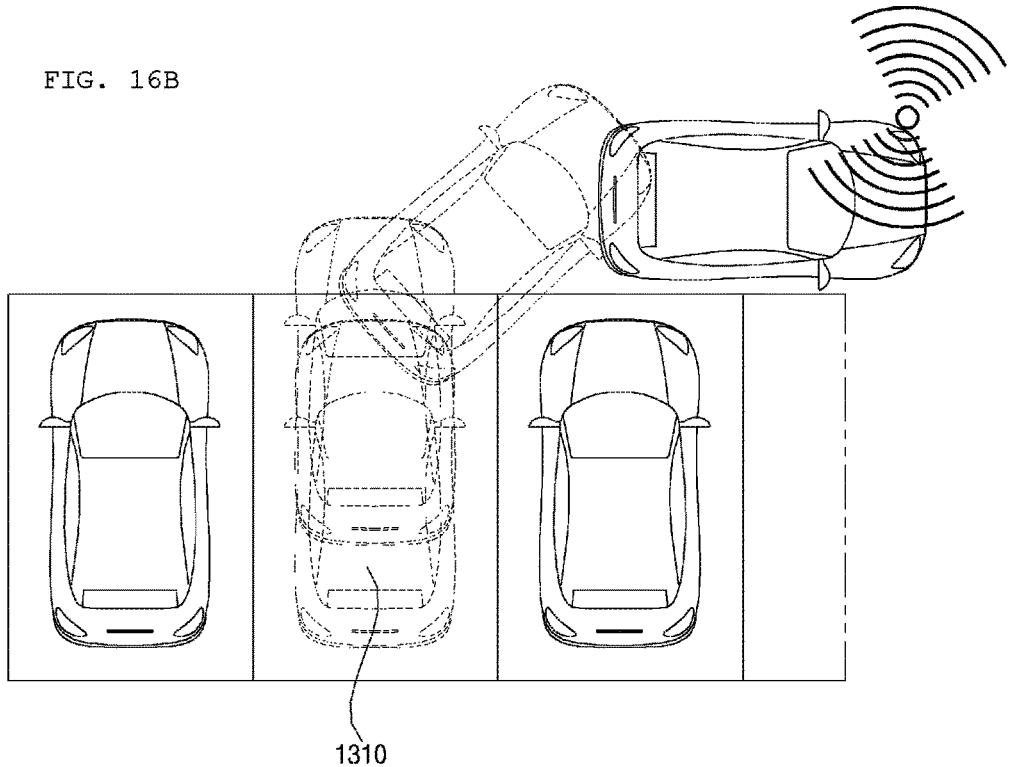
Figure 17:
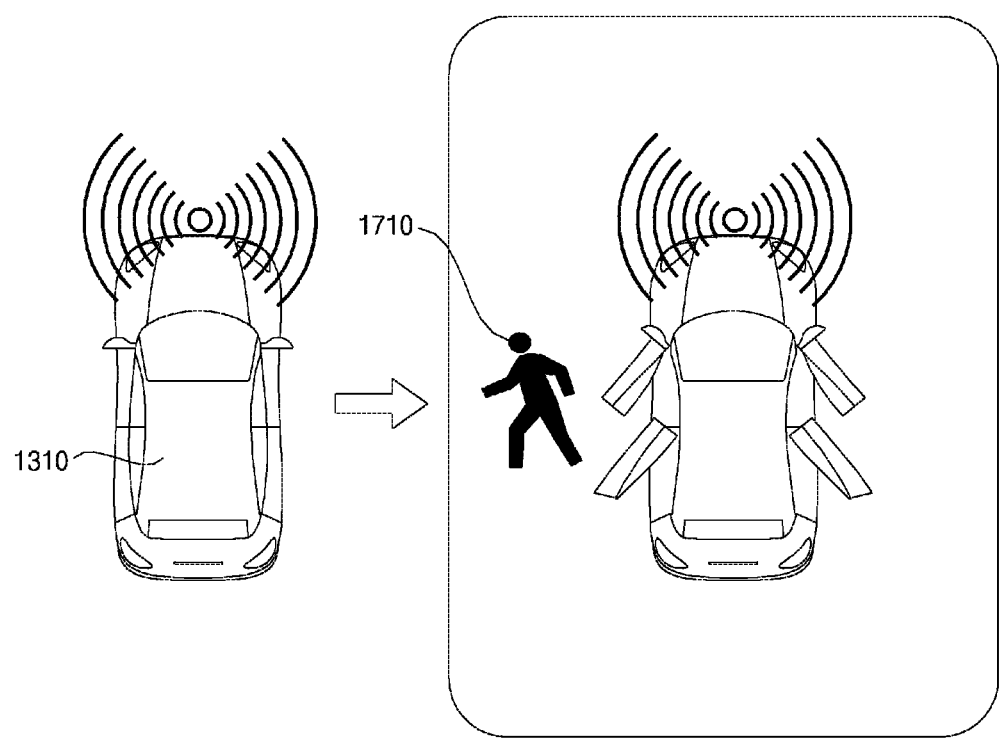

FIGS. 16A to 17 are diagrams for explanation of situation information according to an implementation.

The situation information of the first vehicle 1310 may include at least one of situation information of the first vehicle 1310, operation information of the first vehicle 1310, passenger information of the first vehicle 1310, or surrounding information of the first vehicle 1310.

As exemplified in FIG. 16A, the situation information of the first vehicle 1310 may include parking situation information of the first vehicle 1310.

For example, the situation information of the first vehicle 1310 may include the parking situation information of the first vehicle 1310 at a point based on the location information of the first vehicle 1310.

The first vehicle 1310 may generate the parking situation information based on at least one of start on/off situation information, change lever location information, vehicle speed information, change information of vehicle speed, rotation information of a steering wheel, side view mirror folding/unfolding information, head lamp turn-on/turn-off information, or a door lock/unlock information of the first vehicle 1310.

As exemplified in FIG. 16B, the situation information of the first vehicle 1310 may include park-out situation information of the first vehicle 1310.

For example, the situation information of the first vehicle 1310 may include park-out situation information of the first vehicle 1310 at a point based on the location information of the first vehicle 1310.

The first vehicle 1310 may generate park-out situation information based on at least one of start on/off situation information, change lever location information, vehicle speed information, change information of vehicle speed, rotation information of a steering wheel, side view mirror folding/unfolding information, head lamp turn-on/turn-off information, or a door lock/unlock information of the first vehicle 1310.

As exemplified in FIG. 17, the parking situation information of the first vehicle 1310 may include parking proceeding information and parking completing information at a point based on the location information of the first vehicle 1310.

The first vehicle 1310 may generate the parking completing information based on at least one of information about vehicle speed of 0, information about conversion into transmission lever P, side view mirror folding information, start turn-off information, or lamp turn-off information.

The parking situation information of the first vehicle 1310 may include get-off situation information of a passenger 1710 at a point based on the location information of the first vehicle 1310.

The first vehicle 1310 may recognize the passenger 1710 based on door close information after a door is opened.

The first vehicle 1310 may generate moving direction and moving speed information of the passenger 1710 through a camera included in the first vehicle 1310 (e.g., an AVM camera).

The processor 470 may receive the moving direction and moving speed information of the passenger 1710 from the first vehicle 1310.

The processor 470 may control the UI device 200 to output content based on the moving direction and moving speed information of the passenger 1710.

The situation information of the first vehicle 1310 may include moving situation information of the first vehicle 1310.

The moving situation information of the first vehicle 1310 may include moving direction information of the first vehicle 1310 and moving speed information of the first vehicle 1310.

The first vehicle 1310 may generate moving situation information based on at least one of image data or sensing data. Here, the sensing data may be generated by a gyro sensor and an acceleration sensor.

For example, the moving situation information of the first vehicle 1310 may include reverse traveling situation information of the first vehicle 1310.

Figure 18A:
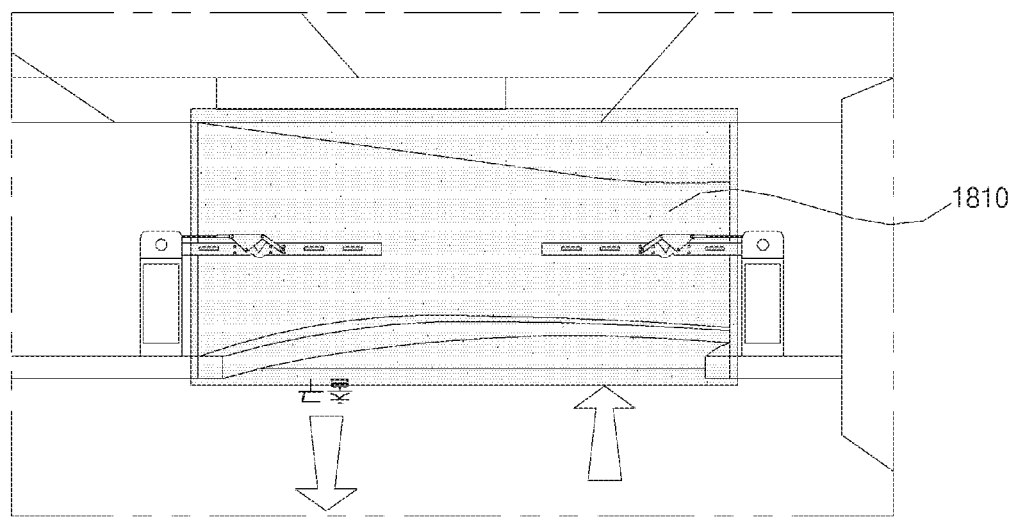
FIGS. 18A and 18B are diagrams illustrating examples of a warning zone according to an implementation.
Figure 18B:
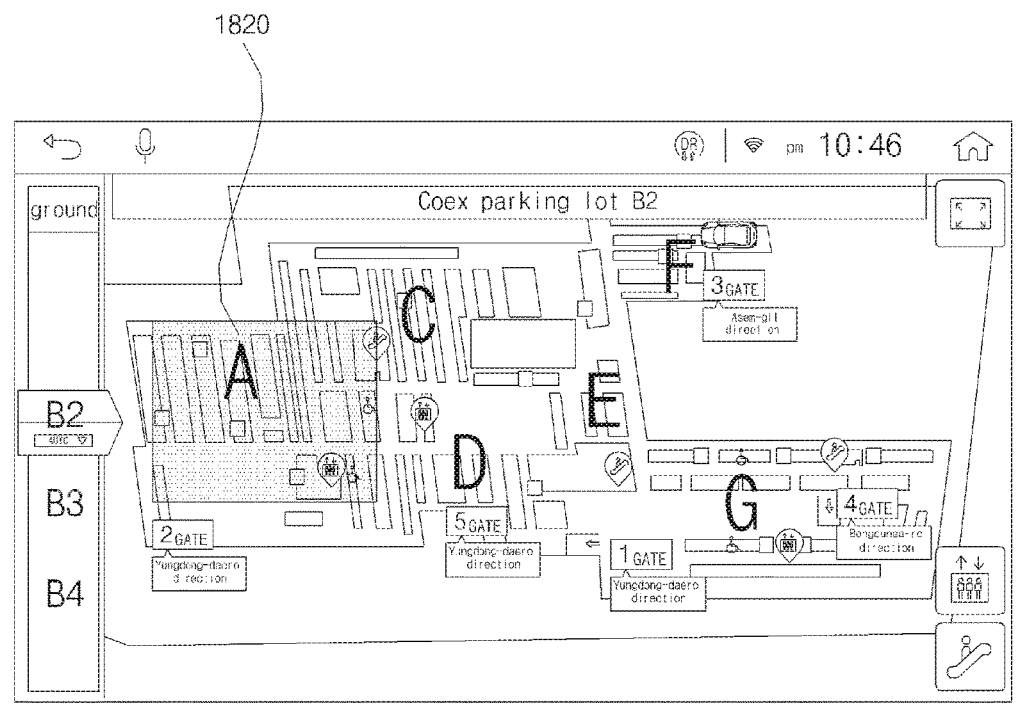

FIGS. 18A and 18B are diagrams for explanation of a warning zone according to an implementation.

Referring to the drawings, the processor 470 may generate a warning zone based on control information of another vehicle.

The warning zone may be defined as a zone in which an alarm is output to a user when an object (e.g., another vehicle or a user) is positioned.

The warning zone may be defined as a region in which the possibility of collision with the vehicle 100 when an object (e.g., another vehicle or a user) is positioned.

The warning zone may be set as a zone within a predetermined distance from the vehicle 100.

The processor 470 may provide information about the generated warning zone to the UI device 200 through the interface unit 480.

The processor 470 may control the UI device 200 to display graphic objects 1810 and 1820 generated based on the warning zone.

The UI device 200 may display the graphic objects 1810 and 1820 generated based on the warning zone.

As exemplified in FIG. 18A, the UI device 200 may display the graphic object 1810 generated based on the warning zone through a HUD.

As exemplified in FIG. 18B, the UI device 200 may display the graphic object 1820 generated based on the warning zone to overlap with a map in a state in which the map is generated.

The processor 470 may apply a graphic effect to the graphic object 1820 with a time difference from a time point in which another vehicle generates location information.

The processor 470 may apply a graphic effect to a graphic object after the first time elapses from a time point at which the filtered location information of the other vehicle 810 is generated.

When the vehicle 100 is spaced apart from the other vehicle 810 by a predetermined distance or more, warning needs to be performed after the first time elapses from a time point in which the location information is generated.

The first time may be determined by the processor 470 based on a distance between the vehicle 100 and the other vehicle 810 and approximate moving speed of an object.

The processor 470 may apply a graphic effect to the graphic object 1820 corresponding to the warning zone with a time difference from a time point of receiving location information from another vehicle.

The processor 470 may apply an effect to a graphic object after a second time elapses from a time point in which the filtered location information of another vehicle is received from the other vehicle 810.

When the vehicle 100 is spaced apart from the other vehicle 810 by a predetermined distance or more, warning needs to be performed after the second time elapses from a time point in which the location information is received.

The second time may be determined by the processor 470 based on a distance between the vehicle 100 and the other vehicle 810 and approximate moving speed of an object.

The graphic effect may include at least one of a blink effect, a blur effect, a highlight effect, a color conversion effect, or other graphic object generation effects.

The processor 470 may assign a reliability degree to location information of another vehicle.

For example, as a time further elapses from a time point of receiving location information of another vehicle, the processor 470 may gradually lower a reliability degree of the location information.

The processor 470 may determine sizes of the graphic objects 1810 and 1820 corresponding to the warning zone, based on the reliability degree of the location information of another vehicle.

As a reliability degree of location information is enhanced, the sizes of the graphic objects 1810 and 1820 corresponding to the warning zone may be determined to be reduced by the processor 470.

As a reliability degree of location information is reduced, the sizes of the graphic objects 1810 and 1820 corresponding to the warning zone may be determined to be increased by the processor 470.

For example, as a time further elapses from a time point of receiving location information of another vehicle, the processor 470 may control the graphic objects 1810 and 1820 corresponding to the warning zone to be gradually increased in sizes.

Figure 19A:
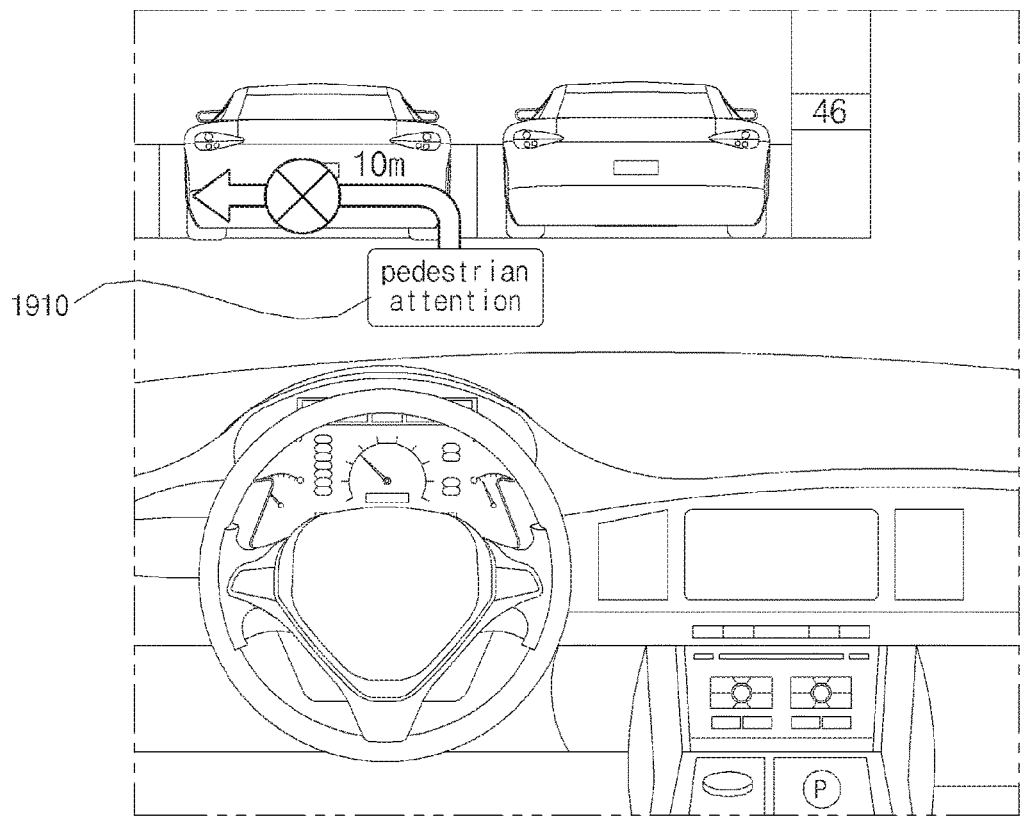
FIGS. 19A, 19B and 19C are diagrams illustrating an examples of a content output operation according to an implementation.
Figure 19B:
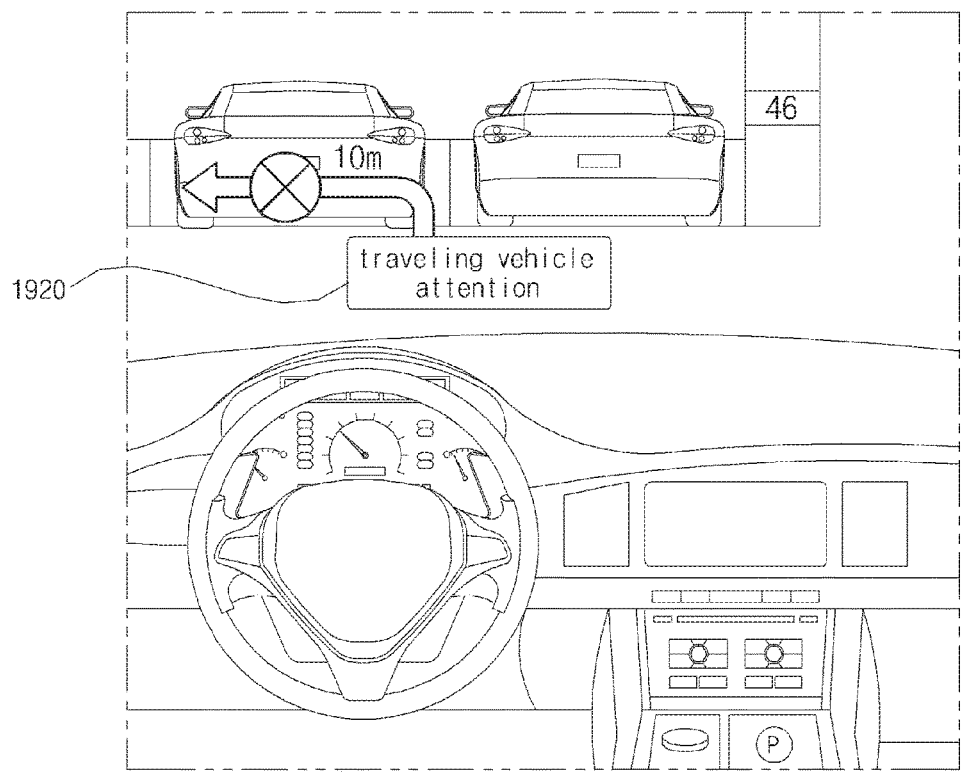
Figure 19C:
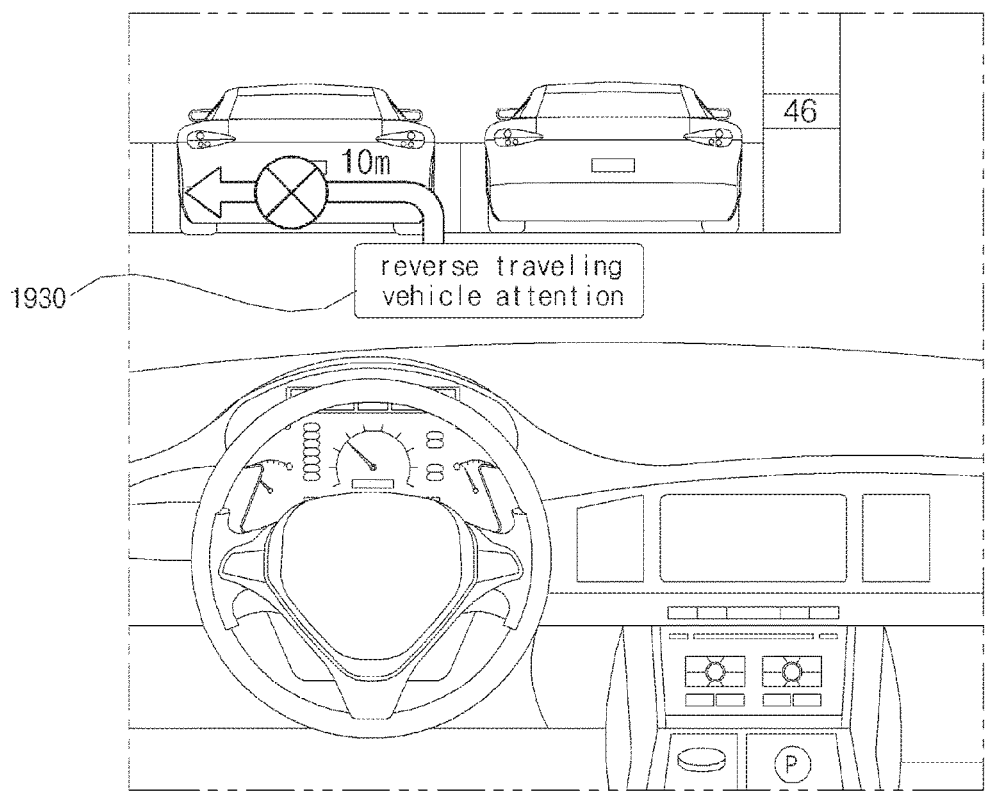

FIGS. 19A to 19C are diagrams for explanation of a content output operation according to an implementation.

The processor 470 may control the UI device 200 to output content processed based on situation information of another vehicle.

As exemplified in FIG. 19A, the processor 470 may provide passenger information of another vehicle to the UI device 200.

The UI device 200 may output pedestrian attention content 1910 based on the passenger information of another vehicle.

As exemplified in FIG. 19B, the processor 470 may provide moving situation information of another vehicle to the UI device 200.

The UI device 200 may output traveling vehicle attention content 1920 based on the moving situation information of another vehicle.

As exemplified in FIG. 19C, the processor 470 may provide reverse traveling situation information of another vehicle to the UI device 200.

The UI device 200 may output reverse vehicle attention content 1930 based on the reverse traveling situation information of another vehicle.

FIGS. 20A to 22 are diagrams for explanation of an operation of a communication device for a vehicle according to an implementation.

The processor 470 may generate a park-in path or a park-out path based on the received situation information of another vehicle.

Figure 20A:
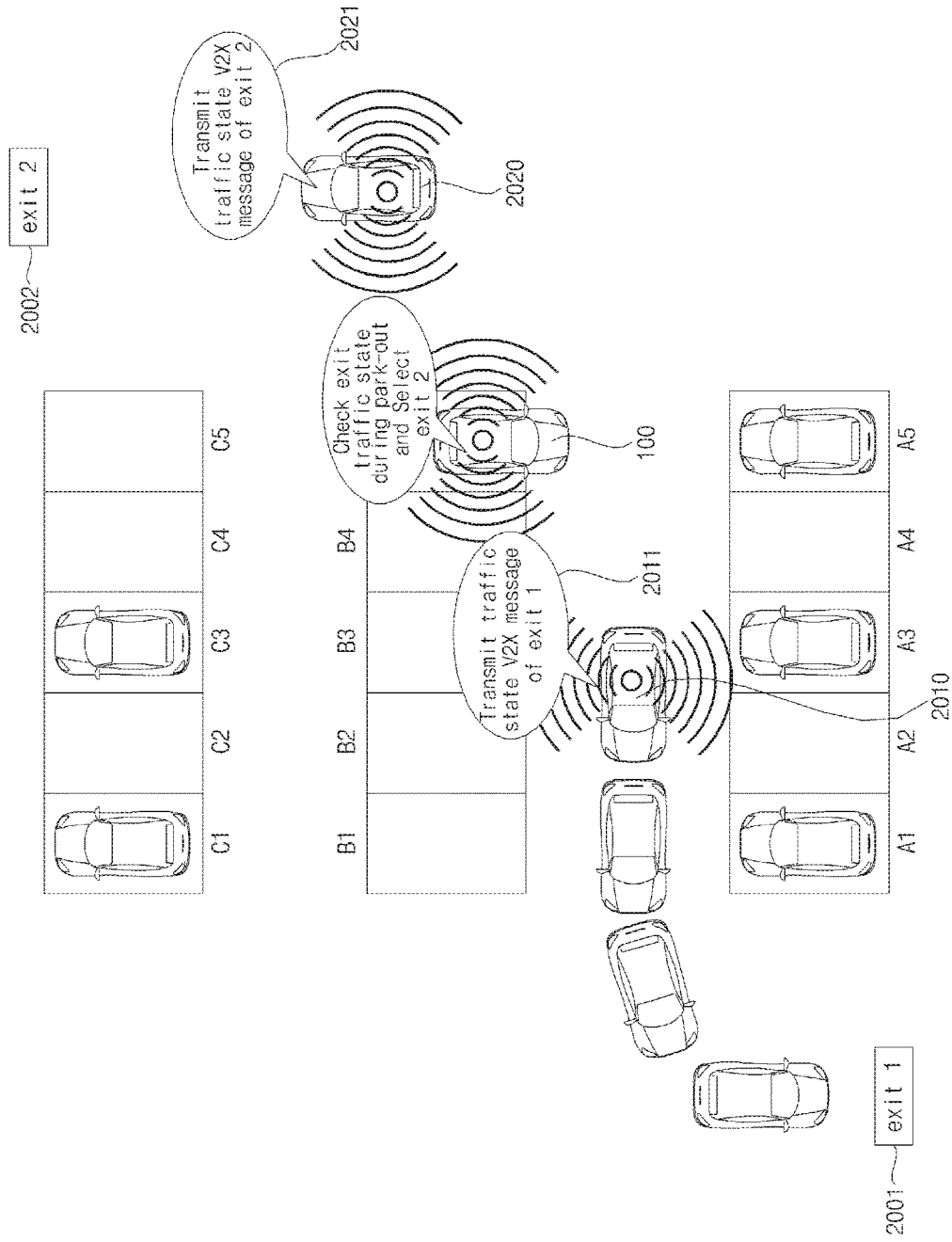
FIGS. 20A-B, 21A-B and 22A-B are diagrams illustrating examples of an operation of a communication device for a vehicle according to an implementation.

As exemplified in FIG. 20A, the processor 470 may receive information 2011 of the first entrance/exit 2001 from a first other vehicle 2010 adjacent to a first entrance/exit 2001.

Information about the first entrance/exit 2001 may include traffic volume information at the first entrance/exit 2001.

The processor 470 may receive information 2021 on the second entrance/exit 2002 from a second other vehicle 2020 adjacent to a second entrance/exit 2002.

Information about the second entrance/exit 2002 may include traffic volume information at the second entrance/exit 2002.

The processor 470 may filter information received from the first other vehicle 2010 and information received from the second other vehicle 2020 based on associated information.

The processor 470 may determine an entrance/entry for park-in and park-out based on the filtered information 2011 on the first entrance/exit 2001 and the filtered information 2021 on the second entrance/exit 2002.

Figure 20B:
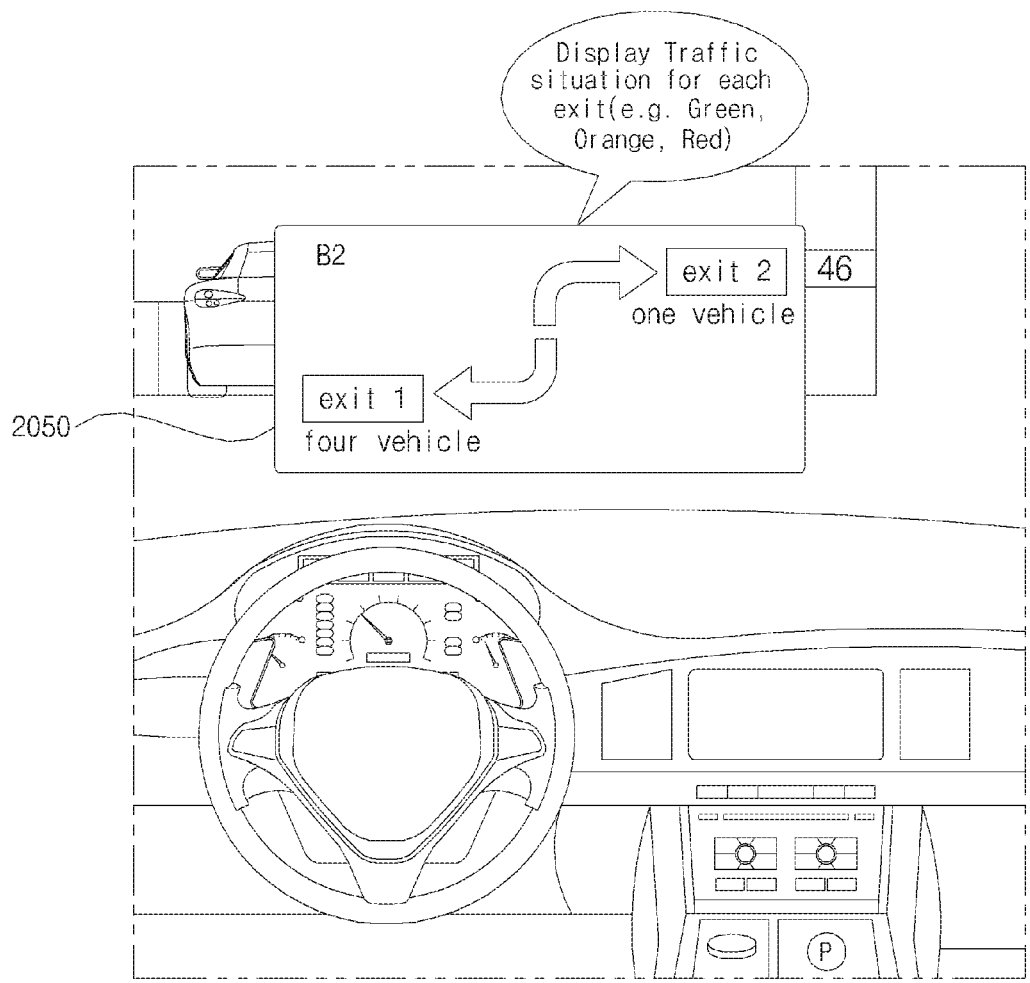

As exemplified in FIG. 20B, the processor 470 may control the UI device 200 to output content 2050 based on the information 2011 on the first entrance/exit 2001 and the information 2021 on the second entrance/exit 2002.

Figure 21A:
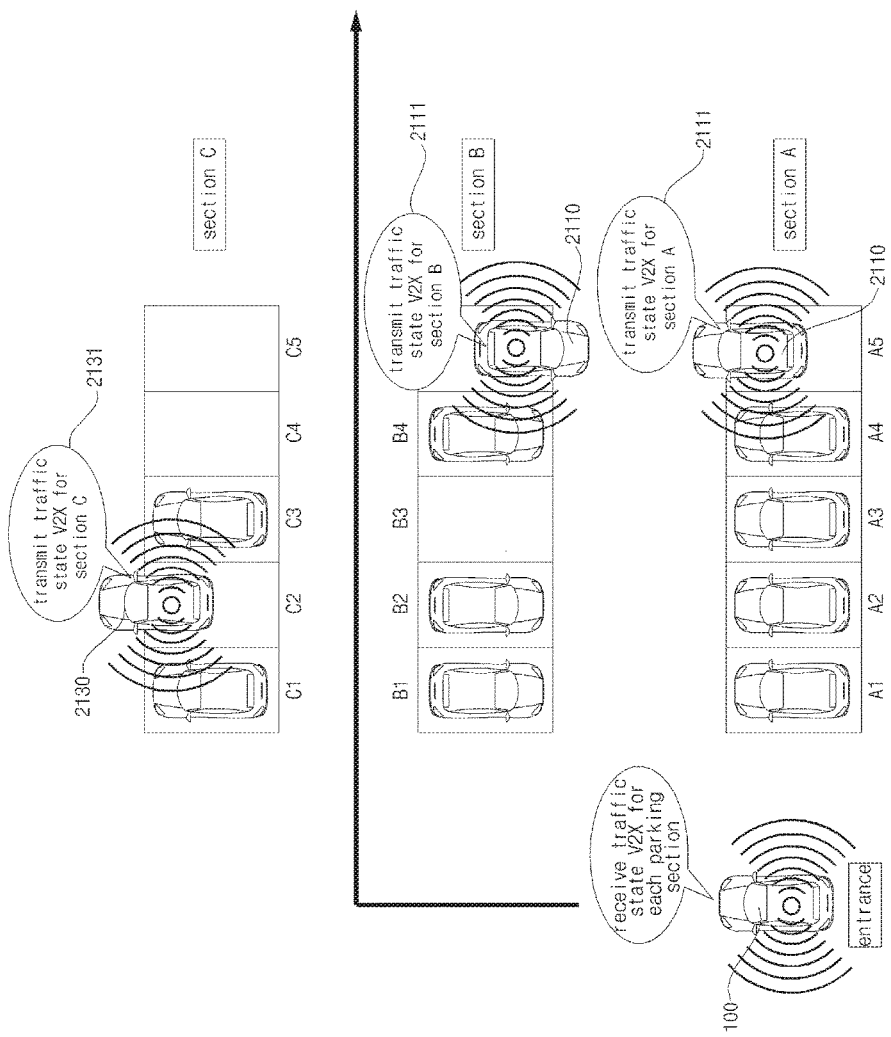

As exemplified in FIG. 21A, the processor 470 may receive information 2111 regarding a section A from a first vehicle 2110 parked in the section A.

The information 2111 on the section A may include information about a parking space of the section A.

The processor 470 may receive information 2121 on a section B from a second vehicle 2120 parked in the section B.

The information 2121 on the section A may include information about a parking space of the section B.

The processor 470 may receive information 2131 on a section C from a third vehicle 2130 parked in the section C.

The information 2131 on the section C may include information about a parking space of the section C.

The processor 470 may filter information received from the first another vehicle 2110, information received from the second another vehicle 2120, and information received from the third another vehicle 2130, based on associated information. The processor 470 may determine a parking space based on the filtered information about the section A, the filtered information about the section B, and the filtered information about the section C.

Figure 21B:
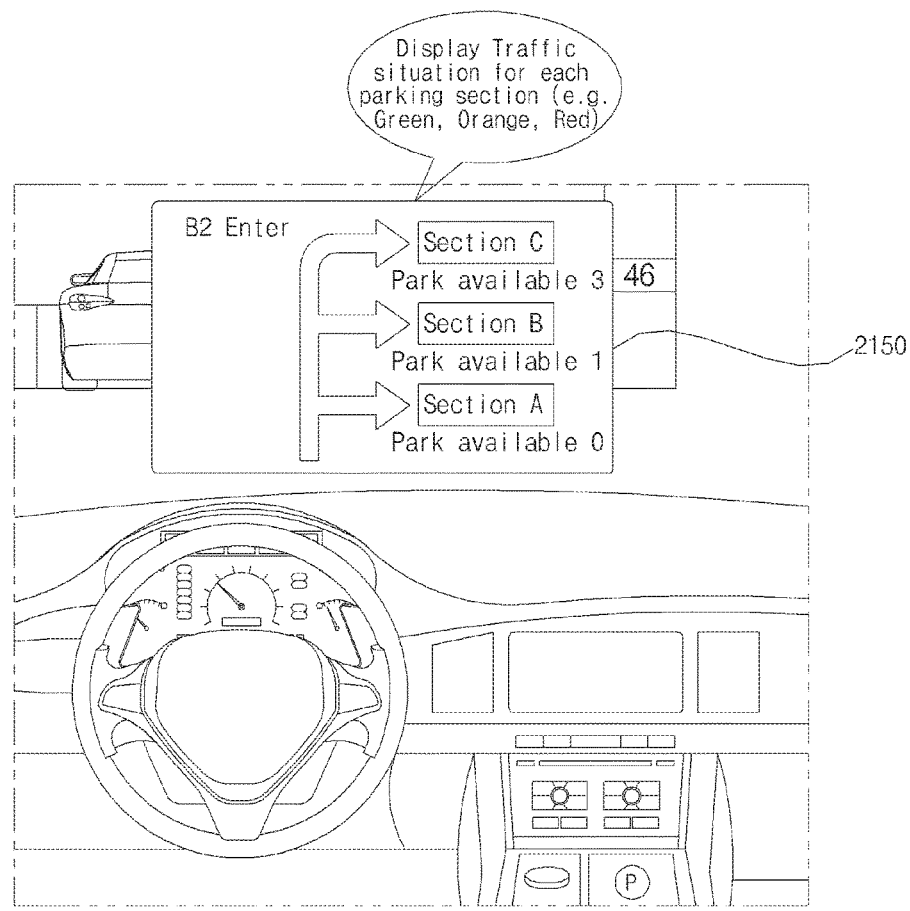

As exemplified in FIG. 21B, the processor 470 may control the UI device 200 to output content 2150 based on the information 2111 on the section A, the information 2121 on the section B, and the information 2131 on the section C.

The processor 470 may receive information about a first vertical level from a first vehicle positioned in the first vertical level.

The information about the first vertical level may include traffic volume information of the first vertical level and information about a parking available space of the first vertical level.

The processor 470 may receive information about a second vertical level from a second vehicle positioned on the second vertical level.

The information about the second vertical level may include traffic volume information of the second vertical level and information about a parking available space of the second vertical level.

The processor 470 may receive information about a third vertical level from a third vehicle positioned on the third vertical level.

The information about the third vertical level may include traffic volume information of the third vertical level and information about a parking available space of the third vertical level.

The processor 470 may filter the information received from the first other vehicle, the information received from the second other vehicle, and the information received from the third other vehicle, based on associated information.

The processor 470 may determine a vertical level for park-in based on the filtered information about the first vertical level, the filtered information about the second vertical level, and the filtered information about the third vertical level.

Figure 22A:
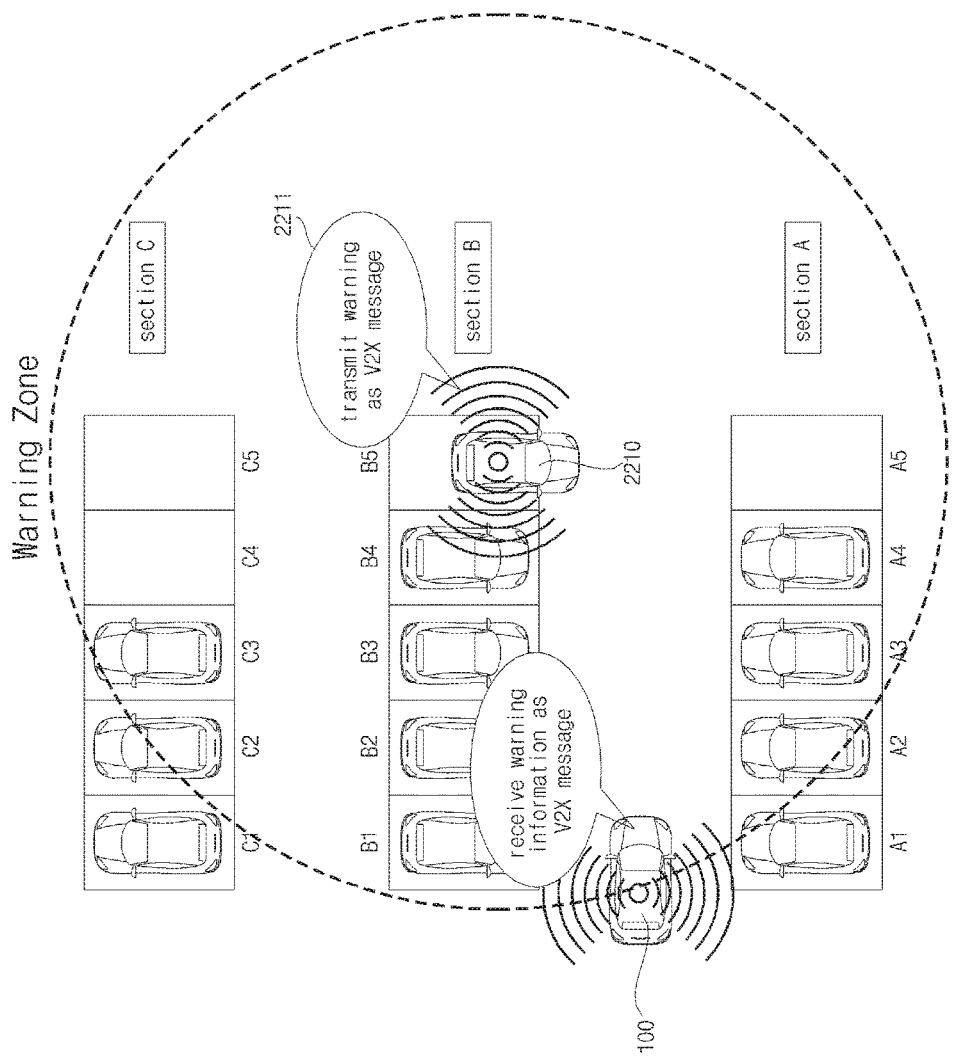

As exemplified in FIG. 22A, the processor 470 may receive trunk open information 2211 from a first other vehicle 2210.

The processor 470 may determine an operation of the vehicle 100 based on the trunk open information 2211.

For example, the processor 470 may determine a brake operation of the vehicle 100 based on the trunk open information 2211.

Figure 22B:
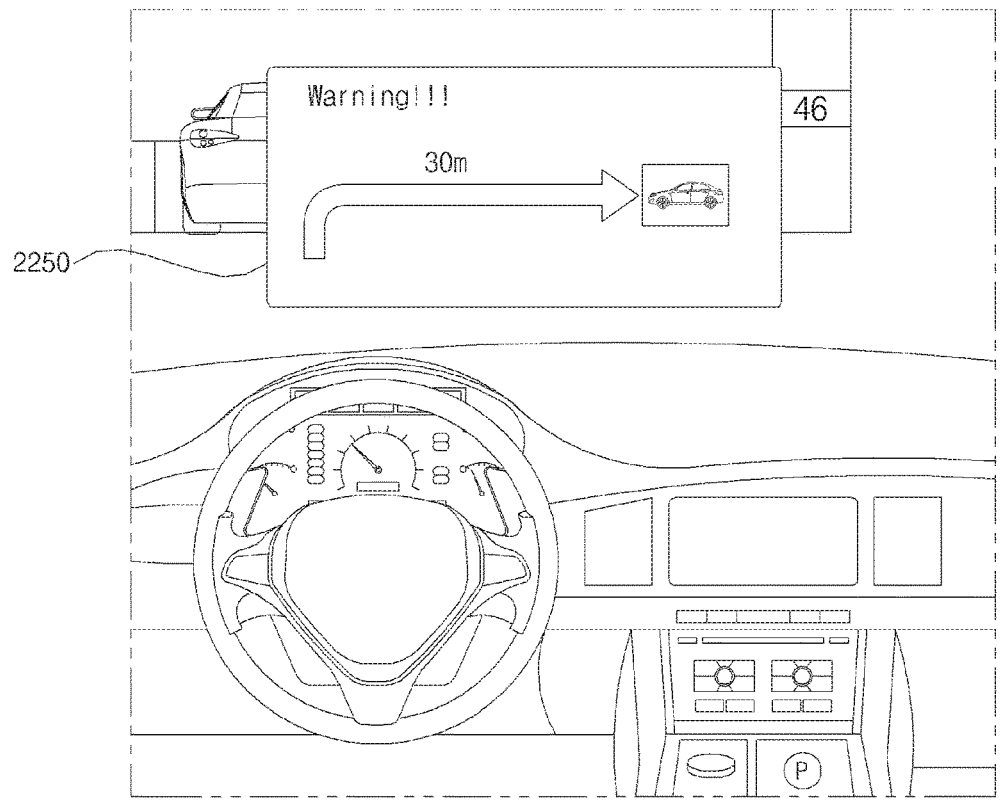

As exemplified in FIG. 22B, the processor 470 may control the UI device 200 to output content 2250 based on trunk open information.

Figure 23:
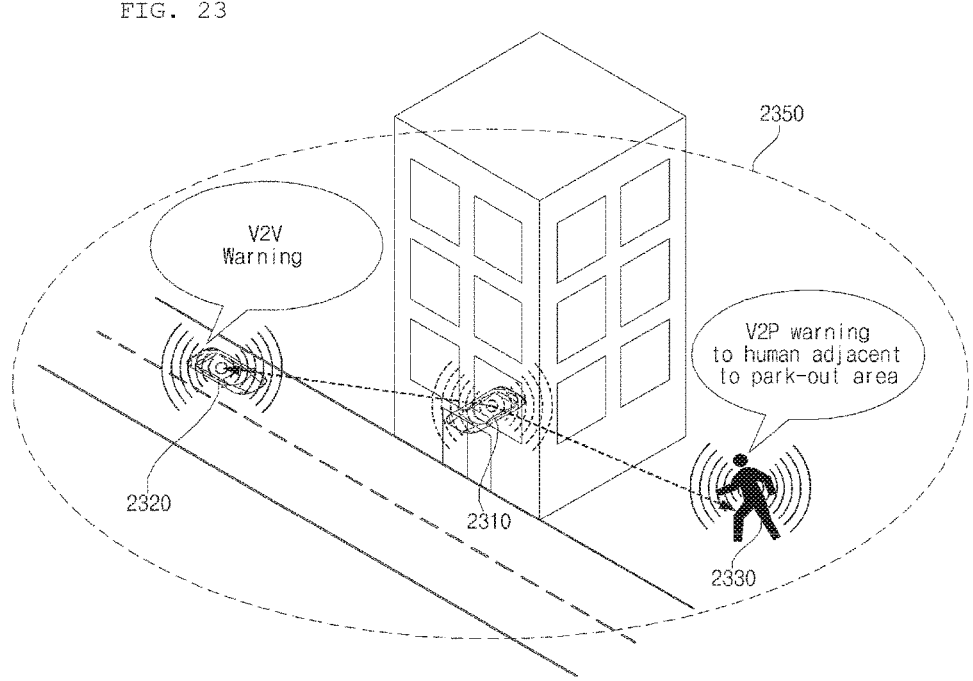
FIG. 23 is a diagram illustrating an example of a vehicle communication device when deviating from a GPS dead zone according to an implementation.

FIG. 23 is a diagram for explanation of a vehicle communication device when deviating from a GPS dead zone according to an implementation.

As exemplified in FIG. 23, when deviating from a first vehicle 2310, a first vehicle 2310 may transmit location information and situation information of the first vehicle 2310 to a surrounding vehicle 2320 or a pedestrian 2330.

The first vehicle 2310 may be the aforementioned owned vehicle 100 or the other vehicle 810.

The surrounding vehicle 2320 may be a vehicle positioned within a predetermined distance from the first vehicle 2310.

The pedestrian 2330 may a pedestrian positioned within a predetermined distance from the first vehicle 2310.

In some implementations, the first vehicle 2310 may set a warning zone 2350 and may transmit the location information and situation information of the first vehicle 2310 to the surrounding vehicle 2320 or pedestrian 2330 positioned within the warning zone 2350.

The warning zone 2350 may be defined as a zone within a predetermined radius based on the first vehicle 2310.

The warning zone 2350 may be defined as a zone in which the likelihood of collision between the first vehicle 2310 and an object exceeds some threshold.

As is apparent from the foregoing description, the implementations of the present disclosure have the following one or more effects.

First, location information of another vehicle of a GPG lost situation may be ensured to appropriately predict a driving situation.

Secondly, situation information of another vehicle may be provided to a user to guide safe driving.

Third, a path may be generated based on surrounding situation information of another vehicle to generate an effective path.

The present disclosure may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor or a controller. The above implementations are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A method of acquiring, by a vehicle, information about one or more vehicles that are located outside of the vehicle, the method comprising:
  in a state in which the one or more vehicles are located in a global positioning system (GPS) dead zone:
    receiving, by at least one processor of the vehicle and from the one or more vehicles, (i) location information of the one or more vehicles, and (ii) situation information that corresponds to the location information, wherein the location information comprises information about a location of the one or more vehicles and the situation information comprises information about a situation of the one or more vehicles;
  filtering, by the at least one processor, the situation information received from the one or more vehicles; and
  controlling, by the at least one processor, a user interface device of the vehicle to output content based on a result of filtering the situation information.

2. The method according to claim 1, wherein filtering the situation information received from the one or more vehicles comprises:
  determining, from among the situation information of the one or more vehicles, first situation information that corresponds to at least one first vehicle among the one or more vehicles that is relevant to the vehicle.

3. The method according to claim 1, wherein the location information received from the one or more vehicles comprises first location information that is generated based on image data acquired by at least one first vehicle among the one or more vehicles.

4. The method according to claim 3, wherein the first location information is generated based on the image data acquired in a state in which the at least one first vehicle among the one or more vehicles enters the GPS dead zone and based on sensing data acquired by the at least one first vehicle.

5. The method according to claim 3, wherein the first location information is generated further based on object information that is generated based on the image data and that relates to an object outside the at least one first vehicle among the one or more vehicles that indicates a first location.

6. The method according to claim 3, wherein the first location information further comprises:
vertical level information regarding one of a plurality of vertical levels on which the at least one first vehicle among the one or more vehicles is located.

7. The method according to claim 1, wherein the situation information received from the one or more vehicles comprises:
parking situation information of the one or more vehicles that corresponds to a location at which the one or more vehicles is parked.

8. The method according to claim 7, wherein the parking situation information comprises:
parking completion information that indicates completion of a parking operation of the one or more vehicles at a location corresponding to the location information; and
passenger exit information that indicates an exit of at least one passenger from the one or more vehicles at the location at which the one or more vehicles is parked.

9. The method according to claim 1, wherein the situation information received from the one or more vehicles comprises:
park-out situation information that indicates a park-out operation of the one or more vehicles from a location corresponding to the location information.

10. The method according to claim 1, wherein the situation information received from the one or more vehicles comprises:
moving situation information that indicates a movement of the one or more vehicles at a location corresponding to the location information.

11. The method according to claim 10, wherein the moving situation information comprises:
information about a moving direction and a moving speed of the one or more vehicles.

12. The method according to claim 1, wherein filtering the situation information of the one or more vehicles that are located outside the vehicle comprises:
acquiring situation information of the vehicle that comprises information about a situation of the vehicle;
based on the situation information of the vehicle, generating associated information that indicates an association between the situation information of the one or more vehicles and the situation information of the vehicle; and
based on the associated information, filtering the situation information of the one or more vehicles.

13. The method according to claim 12, wherein the associated information comprises at least one of:
information regarding a distance between the first vehicle and each of the one or more vehicles,
information relating a speed of the vehicle to a speed of the one or more vehicles,
information indicating whether a path of the vehicle and a path of the one or more vehicles overlap, or
information indicating whether a vertical altitude of the vehicle corresponds to a vertical altitude of the one or more vehicles.

14. The method according to claim 1, wherein controlling the user interface device of the vehicle to output the content based on the result of filtering the situation information comprises:
determining, by the at least one processor, a warning zone that indicates a region outside the vehicle that is relevant to safety of the vehicle; and
controlling, by the at least one processor, the user interface device to display a graphic object corresponding to the warning zone.

15. The method according to claim 14, wherein controlling the user interface device to display the graphic object comprises:
applying a graphic effect to the graphic object based on a first period of time elapsing from a time at which first location information corresponding to the filtered situation information relating to the graphic object was generated by the one or more vehicles.

16. The method according to claim 14, wherein controlling to display the graphic object comprises:
applying a graphic effect to the graphic object based on a second period of time elapsing from a time at which first location information corresponding to the filtered situation information relating to the graphic object was received from the one or more vehicles.

17. The method according to claim 1, further comprising:
generating a park-in path or a park-out path for the vehicle based on a result of filtering the situation information of the one or more vehicles.

18. The method according to claim 17, wherein the situation information of the one or more vehicles comprises traffic volume information at an entrance or an exit, and
wherein generating the park-in path or the park-out path for the vehicle comprises:
based on the traffic volume information, determining an entrance for a parking-in operation of the vehicle or an exit for a parking-out operation of the vehicle.

19. The method according to claim 17, wherein the situation information received from the one or more vehicles comprises traffic volume information for each vertical level of a plurality of vertical levels, and
wherein generating the park-in path or the park-out path for the vehicle comprises:
based on the traffic volume information for each vertical level of the plurality of vertical levels, determining a vertical level for a parking-in operation of the vehicle.

20. A vehicle communication device comprising:
a receiver that is configured to receive information; and
at least one processor that is configured to:
in a state in which the one or more vehicles are located in a global positioning system (GPS) dead zone:
receive, through the receiver and from the one or more vehicles, (i) location information of the one or more vehicles, and (ii) situation information that corresponds to the location information, wherein the location information comprises information about a location of the one or more vehicles and the situation information comprises information about a situation of the one or more vehicles,
filter the situation information received from the one or more vehicles, and
control a user interface device of the vehicle to output content based on a result of filtering the situation information.

21. A method of providing vehicle information by a vehicle, the method comprising:
in a state in which the vehicle is in a global positioning system (GPS) dead zone, acquiring, by the vehicle, image data for a region near the vehicle;
based on the image data, acquiring, by the vehicle, location information that indicates a location of the vehicle;

acquiring, by the vehicle, situation information corresponding to the location information of the vehicle, wherein the situation information indicates a situation of the vehicle; and transmitting, from the vehicle, the location information and the situation information.

* * * * *